(12) United States Patent
Kim et al.

(10) Patent No.: US 9,407,345 B2
(45) Date of Patent: Aug. 2, 2016

(54) EFFICIENT FEEDBACK TRANSMISSION METHOD IN MULTI-ANTENNA WIRELESS COMMUNICATION SYSTEM AND DEVICE FOR SAME

(71) Applicant: LG ELECTRONICS INC., Seoul (KR)

(72) Inventors: Youngtae Kim, Anyang-si (KR); Hyungtae Kim, Anyang-si (KR); Hanjun Park, Anyang-si (KR); Kijun Kim, Anyang-si (KR); Jonghyun Park, Anyang-si (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 14/649,144

(22) PCT Filed: Dec. 10, 2013

(86) PCT No.: PCT/KR2013/011396
§ 371 (c)(1),
(2) Date: Jun. 2, 2015

(87) PCT Pub. No.: WO2014/098399
PCT Pub. Date: Jun. 26, 2014

(65) Prior Publication Data
US 2015/0372732 A1    Dec. 24, 2015

Related U.S. Application Data

(60) Provisional application No. 61/740,402, filed on Dec. 20, 2012.

(51) Int. Cl.
*H04B 7/02* (2006.01)
*H04B 7/04* (2006.01)
*H04B 7/06* (2006.01)

(52) U.S. Cl.
CPC ............. *H04B 7/0478* (2013.01); *H04B 7/04* (2013.01); *H04B 7/0417* (2013.01); *H04B 7/0469* (2013.01); *H04B 7/065* (2013.01); *H04B 7/0626* (2013.01); *H04B 7/0639* (2013.01)

(58) Field of Classification Search
CPC ......... H04L 1/06; H04L 5/023; H04L 27/362; H04B 7/02
USPC ........................... 375/267, 260, 224; 370/252
See application file for complete search history.

(56) References Cited

U.S. PATENT DOCUMENTS

| | | | |
|---|---|---|---|
| 2011/0032839 A1* | 2/2011 | Chen | H04B 7/024 370/252 |
| 2012/0003945 A1 | 1/2012 | Liu et al. | |

(Continued)

FOREIGN PATENT DOCUMENTS

WO    WO2011162520 A2    12/2011

OTHER PUBLICATIONS

Huawei, "Differential feedbacks scheme evaluation", R1-100254, 3GPP TSG RAN WG1 meeting #59bis, Valencia, Spain, Jan. 18-22, 2010 (http://www.3gpp.org/DynaReport/TDocExMtg--R1-59b--28028.htm), see p. 1.

*Primary Examiner* — Daniel Washburn
*Assistant Examiner* — Fitwi Hailegiorgis
(74) *Attorney, Agent, or Firm* — Dentons US LLP

(57) ABSTRACT

The present invention relates to a method by which a terminal feeds back channel state information for downlink transmission in a wireless communication system supporting multiple antennas. More specifically, the present invention comprises a step of transmitting a first precoding matrix index (PMI) and a second PMI for each sub-band, wherein a precoding matrix preferred by the terminal is instructed to combine the first PMI and the second PMI, and a precoding codebook in which a portion of a plurality of bits forming the second PMI is additionally used to form the first PMI is applied.

2 Claims, 7 Drawing Sheets

(56) References Cited

U.S. PATENT DOCUMENTS

| | | |
|---|---|---|
| 2012/0039251 A1 | 2/2012 | Sayana et al. |
| 2012/0063500 A1* | 3/2012 | Wang .................. H04L 1/0026 375/224 |
| 2012/0082190 A1 | 4/2012 | Zhu et al. |

* cited by examiner

Report 1   Report 2 w/ PTI=0   Report 3 w/ PTI=0

Report 2 w/ PTI=1   Report 3 w/ PTI=1

(a)

(b)

(c)

EFFICIENT FEEDBACK TRANSMISSION METHOD IN MULTI-ANTENNA WIRELESS COMMUNICATION SYSTEM AND DEVICE FOR SAME

This application is a 35 U.S.C. §371 National Stage Entry of International Application No. PCT/KR2013/011396 filed Dec. 10, 2013, which claims benefit of and priority to U.S. Provisional Application No. 61/740,402 filed Dec. 20, 2012, both of which are incorporated by reference for all purposes as if fully set forth herein.

FIELD OF THE INVENTION

The present invention relates to a wireless communication system and, more particularly, to an efficient feedback transmission method in a multi-antenna wireless communication system and a device for the same.

BACKGROUND ART

MIMO (multiple input multiple output) refers to a method for improving transmission/reception data efficiency using a plurality of transmit (Tx) antenna and a plurality of receive (Rx) antennas instead of a single Tx antenna and a single Rx antenna. That is, MIMO is a scheme in which a transmitting end or a receiving end of a wireless communication system improves capacity or enhances performance using multiple antennas. MIMO may be referred to as multi-antenna technology.

To support multi-antenna transmission, a precoding matrix for appropriately distributing transmission information to antenna s according to channel state can be applied. 3GPP (3rd Generation Partnership Project) LTE (Long Term Evolution) supports a maximum of 4 Tx antennas (4Tx) for downlink transmission and defines a precoding codebook for downlink transmission using the Tx antennas.

In a MIMO based cellular communication environment, data transfer rate can be improved through beamforming between a transmitting end and a receiving end. Whether beamforming is applied is determined based on channel information, a channel estimated through a reference signal at the receiving end is appropriately quantized using a codebook and fed back to the transmitting end.

A description will be given of a spatial channel matrix (or channel matrix) which can be used to generate a codebook. The spatial channel matrix (or channel matrix) can be represented as follows.

$$H(i,k) = \begin{bmatrix} h_{1,1}(i,k) & h_{1,2}(i,k) & \ldots & h_{1,N_t}(i,k) \\ h_{2,1}(i,k) & h_{2,2}(i,k) & \ldots & h_{2,N_t}(i,k) \\ \vdots & \vdots & \ddots & \vdots \\ h_{N_r,1}(i,k) & h_{N_r,2}(i,k) & \ldots & h_{N_r,N_t}(i,k) \end{bmatrix}$$

Here, $H(i,k)$ represents a spatial channel matrix, $N_r$ denotes the number of Rx antennas, $N_t$ denotes the number of Tx antennas, r is an Rx antenna index, t is a Tx antenna index, i represents an OFDM (or SC-FDMA) symbol index and k represents a subcarrier index.

$h_{r,t}(i,k)$ is an element of the channel matrix $H(i,k)$ and represents an r-th channel state and a t-th antenna corresponding to an i-th symbol and k-th subcarrier.

In addition, a spatial channel covariance matrix which can be used in the present invention will now be briefly described. The spatial channel covariance matrix can be represented by R.

$$R = E[H_{i,k}^H H_{i,k}]$$

where H denotes a spatial channel matrix and R denotes a spatial channel covariance matrix. In addition, E[] represents the mean, i represents a symbol index and k represents a frequency index.

SVD (Singular Value Decomposition) is a method for decomposing a rectangular matrix, which is widely used in signal processing and statistics. SVD is to normalize matrix spectrum theory for an arbitrary rectangular matrix. An orthogonal square matrix can be decomposed into diagonal matrices using an Eigen value as a basis using spectrum theory. When it is assumed that the channel matrix H is an m×n matrix composed of a plurality of set elements, the matrix H can be represented as a product of three matrices as follows.

$$H_{m \times n} = U_{m \times n} \Sigma_{m \times n} V_{n \times n}^H$$

Here, U and V represent unitary matrices and $\Sigma$ denotes an m×n matrix including a non-zero singular value. The singular value is $\Sigma = \text{diag}(\sigma_1 \ldots \sigma_r)$, $\sigma_i = \sqrt{\lambda_i}$. Representation as a product of three matrices is referred to as SVD. SVD can handle normal matrices, compared to Eigen value decomposition which can decompose only orthogonal square matrices. SVD and Eigen value composition are related to each other.

When the matrix H is a positive definite Hermitian matrix, all Eigen values of H are non-negative real numbers. Here, singular values and singular vectors of H are equal to Eigen values and Eigen vectors of H. Eigen value decomposition (EVD) can be represented as follows (here, Eigen values may be $\lambda_1, \ldots, \lambda_r$).

$$HH^H = (U\Sigma V^H)(U\Sigma V^H) = U\Sigma\Sigma^T U^H$$

$$H^H H = (U\Sigma V^H)^H (U\Sigma V^H) = V\Sigma^T \Sigma V$$

Here, Eigen values can be $\lambda_1, \ldots, \lambda_r$. Information on U between U and V, which indicate channel directions, can be known through singular value decomposition of $HH^H$ and information on V can be known through singular value decomposition of $H^H H$. In general, a transmitting end and a receiving end respectively perform beamforming in order to achieve higher throughput in multi-user MIMO (MU-MIMO). When a receiving end beam and a transmitting end beam are represented by matrices T and W, a channel to which beamforming is applied is indicated by THW=TU(Σ)VW. Accordingly, it is desirable to generate the receiving end beam on the basis of U and to generate the transmitting end beam on the basis of V in order to accomplish higher throughput.

In designing a codebook, it is necessary to reduce feedback overhead using as few bits as possible and to correctly quantize a channel to obtain a sufficient beamforming gain. One of codebook design schemes presented or adopted as a standard by recent mobile communication systems, such as 3GPP LTE (3rd Generation Partnership Project Long Term Evolution), LTE-Advanced and IEEE 16 m, is to transform a codebook using a long-term covariance matrix of a channel, as represented by Equation 1.

$$W' = \text{norm}(RW) \quad \text{[Equation 1]}$$

Here, W denotes an existing codebook generated to reflect short-term channel information, R denotes a long-term covariance matrix of channel matrix H, norm(A) represents a matrix in which norm is normalized into 1 per column of matrix A, and W' represents a final codebook generated by transforming the codebook W using the channel matrix H, the long-term covariance matrix R of the channel matrix H and a norm function.

The long-term covariance matrix R of the channel matrix H can be represented as Equation 2.

$$R = E[H^H H] = V \Lambda V^H = \sum_{i=1}^{Nt} \sigma_i v_i v_i^H \quad \text{[Equation 2]}$$

Here, the long-term covariance matrix R of the channel matrix H is decomposed into $V \Lambda V^H$ according to singular value decomposition. V is an Nt×Nt unitary matrix having $V_i$ as an i-th column vector, $\Lambda$ is a diagonal matrix having $\sigma_i$ as an i-th diagonal component and $V^H$ is a Hermitian matrix of V. In addition, $\sigma_i$ and $V_i$ respectively denote an i-th singular value and an i-th singular column vector corresponding thereto ($\sigma_1 \geq \sigma_2 \geq \ldots \geq_{Nt}$).

DETAILED DESCRIPTION OF THE INVENTION

Technical Objects

A technical object of the present invention is to provide an efficient feedback transmission method in a wireless communication system and a device for the same.

The technical objects of the present invention will not be limited only to the objects described above, and, accordingly, other technical objects that have not been mentioned above may become apparent to those having ordinary skill in the art from the description presented below.

Technical Solutions

According to an aspect of the present invention for resolving the above-described problem, a method used by a user equipment for feeding-back channel state information respective to a downlink transmission in a wireless communication system supporting multiple antennae includes a step of transmitting a first precoding matrix index (PMI) and a second PMI for each sub-band, wherein a precoding matrix preferred by the terminal is instructed to combine the first PMI and the second PMI, and wherein a precoding codebook in which a portion of a plurality of bits forming the second PMI is additionally used to form the first PMI is applied.

According to another aspect of the present invention for resolving the above-described problem, a user equipment feeding-back channel state information respective to a downlink transmission in a wireless communication system supporting multiple antennae includes a Radio Frequency Unit; and a Processor, wherein the Processor is configured to transmit a first precoding matrix index (PMI) and a second PMI for each sub-band, and wherein a precoding matrix preferred by the terminal is instructed to combine the first PMI and the second PMI, and wherein a precoding codebook in which a portion of a plurality of bits forming the second PMI is additionally used to form the first PMI is applied.

Advantageous Effects

According to an exemplary embodiment of the present invention, an efficient feedback transmission method in a wireless communication system and a device for the same may be provided.

The effects of the present invention will not be limited only to the effects described above, and, accordingly, other effects that have not been mentioned above may become apparent to those having ordinary skill in the art from the description presented below.

BRIEF DESCRIPTION OF THE DRAWINGS

The accompanying drawings, which are included as a part of the detailed description in order to provide a further understanding of the present invention, provide exemplary embodiments of the present invention and describe the technical aspects of the present invention along with the detailed description.

BEST MODE FOR CARRYING OUT THE PRESENT INVENTION

Figure 1:
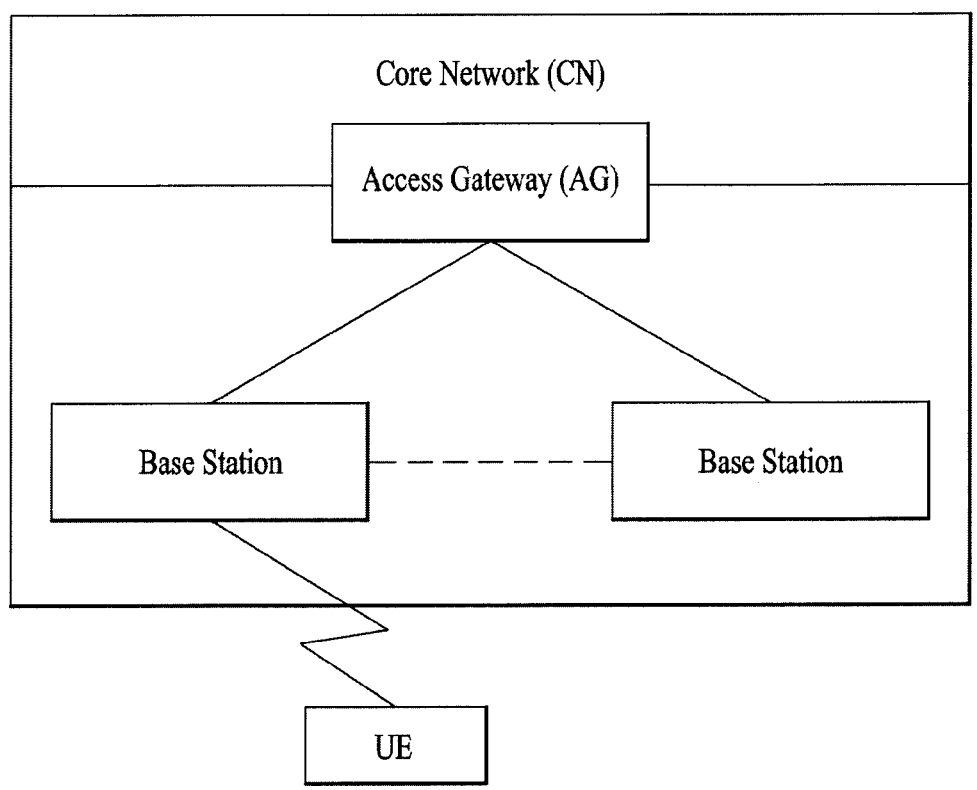
FIG. 1 illustrates a general view of an E-UMTS network structure as an example of a communication system.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention, and, therefore, the embodiments presented in this specification do not correspond to the only embodiments that can be realized according to the present invention. The following description of the present invention shall include the description of detailed features of the present invention in order to provide full and complete understanding of the present invention. However, it will be apparent to those skilled in the art that the present invention can be realized even without the detailed features described herein. For example, although the following description will be made based on a mobile communication system corresponding to a 3GPP LTE system, the following description can be applied to other mobile communication systems except for the unique features of 3GPP LTE.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Additionally, throughout the entire description of the present invention, the same reference numerals will be used for the same elements of the present invention.

Furthermore, in the following description, it will be assumed that UE will collectively refer to mobile or fixed user-end devices, such as a UE (User Equipment), MS (Mobile Station), AMS (Advanced Mobile Station), and so on. Additionally, it will also be assumed that the base station will collectively refer to an arbitrary node of a network end communication with the UE, such as Node B, eNode B, Base Station, AP (Access Point), and so on.

In the mobile communication station, the UE (User Equipment) may receive information from the BS via Downlink, and the UE may also transmit information via Uplink. The information being transmitted or received by the UE may correspond to data and diverse control information, and diverse physical channel exist in accordance with different purposes of the information being transmitted or received by the UE.

As an example of a communication system to which the present invention may be applied, a 3GPP LTE ($3^{rd}$ Generation Partnership Project Long Term Evolution; hereinafter referred to as "LTE"), LTE-Advanced (hereinafter referred to as 'LTE-A') communication system will now be generally described.

FIG. 1 illustrates a general view of an E-UMTS network structure as an example of a communication system.

The E-UMTS (Evolved Universal Mobile Telecommunications System) corresponds to a system evolved from the conventional (or legacy) UMTS (Universal Mobile Telecommunications System). The 3GPP is presently carrying out a basic standardization process for the E-UMTS. Generally, the E-UMTS may also be referred to as an LTE (Long Term Evolution) system. For details of the technical specifications of the UMTS and the E-UMTS, reference may be made to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG), which is located at an end of a network (E-UTRAN) and connected to an external network. The base stations (BSs) may simultaneously transmit multiple data streams for a broadcast service, a multicast service and/or a unicast service.

One or more cells may exist for one BS. One cell is set to one of bandwidths of 1.25, 2.5, 5, 10, 15, and 20 Mhz to provide a downlink or uplink transport service to several UEs. Different cells may be configured to provide different bandwidths. Also, one BS controls data transmission and reception for a plurality of UEs. The BS transmits Downlink (DL) scheduling information of downlink data to the corresponding UE to notify information related to time/frequency domains to which data will be transmitted, encoding, data size, and Hybrid Automatic Repeat and reQuest (HARQ).

Additionally, the BS transmits Uplink (UL) scheduling information of uplink data to the corresponding UE to notify information related to time and frequency domains that can be used by the corresponding UE, encoding, data size, and Hybrid Automatic Repeat and reQuest (HARQ). An interface for transmitting user traffic or control traffic can be used between the BSs. A Core Network (CN) may include the AG and a network node or the like for user registration of the UE. The AG manages mobility of a UE on a TA (Tracking Area) unit basis, wherein one TA unit includes a plurality of cells.

The wireless communication technology has been developed up to the LTE based upon Wideband Code division Multiple Access (WCDMA). However, the demands and expectations of the users and the manufacturers and providers are growing continuously. Also, since other wireless access technologies are constantly being developed, the wireless communication technology is required to newly evolve in order to ensure competiveness in the future. Accordingly, characteristics, such as reduced cost for each bit, extended service availability, usage of a flexible frequency band, simple structure and open interface, and adequate power consumption of the UE are being requested.

Recently, in 3GPP, standardization procedures for a successive technology of LTE have been carried out. In this specification, the successive technology will be referred to as "LTE-Advanced" or "LTE-A". One of the main differences between an LTE system and an LTE-A system corresponds to a difference in the system bandwidth. The LTE-A system is targeted to support a maximum wide band of 100 MHz, and, for this, the LTE-A system is designed to use carrier aggregation or bandwidth aggregation technology that can achieve wide band by using multiple frequency blocks. In order to use a wider frequency bandwidth, carrier aggregation is designed to use multiple frequency blocks as a single large logical frequency band. The bandwidth of each frequency block may be defined based upon a bandwidth of a system block, which is used in an LTE system. Each frequency block is transmitted by using a component carrier.

Figure 2:
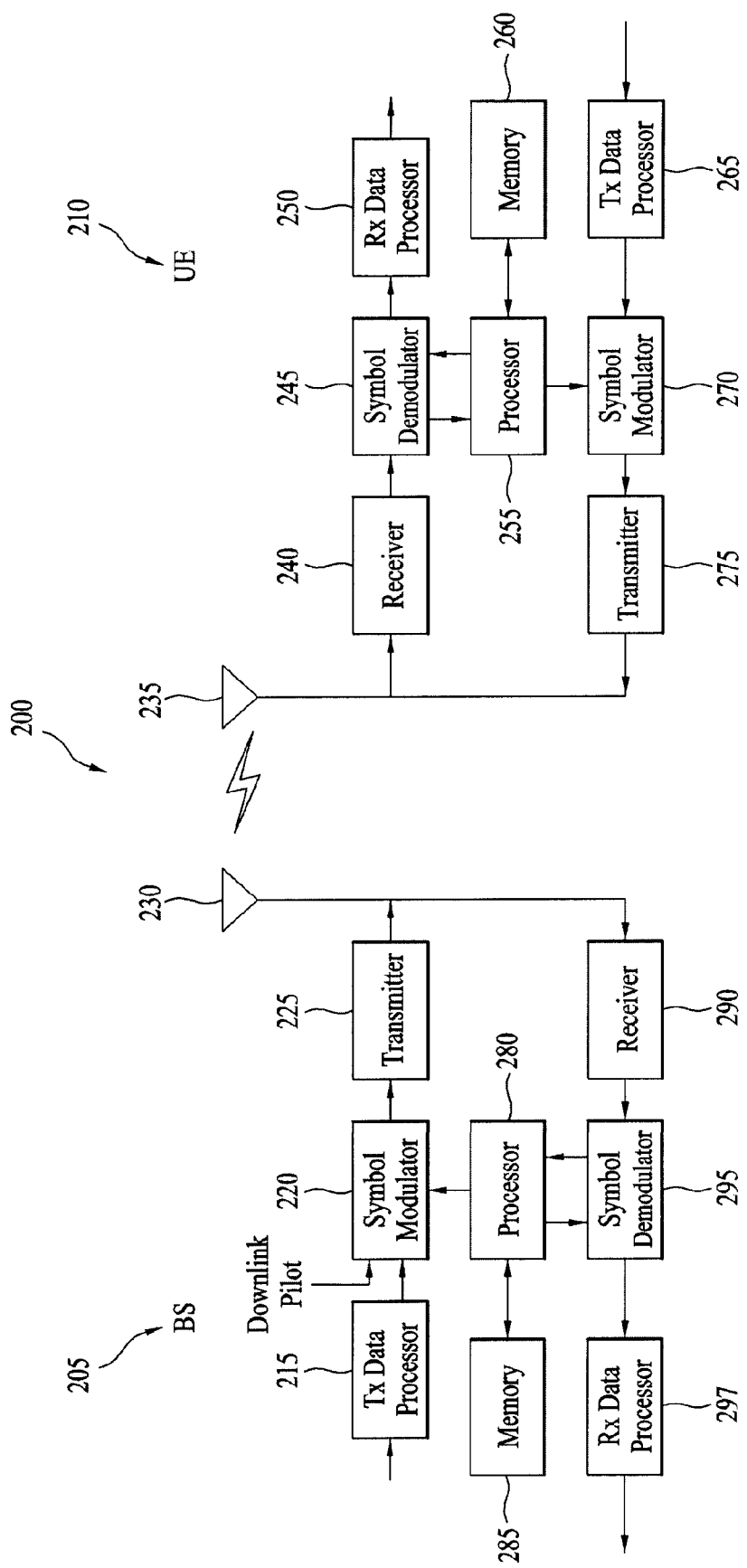
FIG. 2 illustrates structures of a base station (105) and a user equipment (110) in a wireless communication system (100).

FIG. 2 illustrates structures of a base station (105) and a user equipment (110) in a wireless communication system (100).

In order to illustrate a simplified structure of the wireless communication system (100), although the wireless communication system (100) is shown to include one base station (BS) (105) and one user equipment (UE) (110), the wireless communication system (100) may include at least one or more BSs and/or at least one or more UEs.

Referring to FIG. 2, the BS (105) may include a transmission (Tx) data processor (115), a symbol modulator (120), a transmitter (125), a transceiving antenna (130), a processor (180), a memory (185), a receiver (190), a symbol demodulator (195), and a reception data processor (197). And, the UE (110) may include a transmission (Tx) data processor (165), a symbol modulator (170), a transmitter (175), a transceiving antenna (135), a processor (155), a memory (160), a receiver (140), a symbol demodulator (155), and a reception data processor (150). Although it is shown in the drawing that the BS (105) and the UE (110) each includes only one antenna (130, 135), the BS (105) and the UE (110) each corresponds to a multi-antenna being equipped with a plurality of antennae. Therefore, the BS (105) and the UE (110) according to the present invention support a MIMO (Multiple Input Multiple Output) system. Additionally, the BS (105) and the UE (110) according to the present invention may support both SU-MIMO (Single User-MIMO) and MU-MIMO (Multi User-MIMO) schemes (or methods).

Within the downlink, the transmission data processor (115) receives traffic data, formats the received traffic data, codes the formatted traffic data, interleaves and modulates (or symbol-maps) the coded traffic data, and provides the modulated symbols ("data symbols"). The symbol modulator (120) receives and processes such data symbols and pilot symbols and provides a stream of symbols.

The symbol modulator (120) multiplexes data and pilot symbols and transmits the multiplexed symbols to the transmitter (125). Herein, each of the transmitted symbols may correspond to a data symbol, a pilot symbol, or a signal value of zero. In each symbol cycle (or duration), the pilot symbols may be consecutively transmitted. The pilot symbols may correspond to Frequency Division Multiplexing (FDM), Orthogonal Frequency Division Multiplexing (OFDM), Time Division Multiplexing (TDM), or Code Division Multiplexing (CDM) symbols.

The transmitter (125) receives the stream of symbols and converts the received stream to at least one or more analog signals, and, also, by additionally adjusting (e.g., by amplifying, filtering, and frequency upconverting such analog signals, the transmitter (125) generates a downlink signal, which is suitable for transmission through a wireless channel (or radio channel). Thereafter, the downlink signal is transmitted to the UE through the antenna (130).

In the UE (110), the antenna (135) receives the downlink signal from the BS and provides the received signal to the receiver (140). The receiver (140) adjusts (e.g., performs filtering, amplification, and frequency downconverting) and acquires samples by digitalizing the adjusted signals. The symbol demodulator (145) demodulates the received pilot symbols and provides the demodulated pilot symbols to the processor (125) for channel estimation.

Additionally, the symbol demodulator (145) receives a frequency response estimation value respective to the downlink from the processor (155), performs data demodulation on the received data symbols, acquires data symbol estimation values (corresponding to estimation values of the transmitted data symbols), and provides the data symbol estimation values to the reception (Rx) data processor (150). The reception data processor (150) performs demodulation (i.e., symbol demapping), deinterleaving, and decoding on the symbol estimation values, so as to recover the transmitted traffic data.

The processing of the symbol demodulator (145) and the reception data processor (150) is complementary to the processing of the symbol modulator (120) and the transmission data processor (115) in the BS (105).

The UE (110), in the uplink, the transmission data processor (165) processes traffic data and provides data symbols. The symbol modulator (170) receives and multiplexes data symbols and performs modulation, thereby being capable of providing a stream of symbols to the transmitter (175). The transmitter (175) receives and processes the stream of symbols, so as to generate an uplink signal, and, then, such uplink signal is transmitted to the BS (105) through the antenna (135).

In the BS (105), the uplink signal is received from the UE (110) through the antenna (130), and the receiver (190) acquires samples by processing the received uplink signal. Subsequently, the symbol demodulator (195) processes the acquired samples and provides pilots symbols that are received with respect to the uplink and the data symbol estimation values. The reception data processor (197) processes the data symbol estimation values, so as to recover the traffic data, which are transmitted from the UE (110).

Each of the processors (155, 180) respectively belonging to the UE (110) and the BS (105) directs operations (e.g., control, adjustment, management, and so on) performed in each of the UE (110) and the BS (105). Each of the processors (155, 180) may be respectively connected to memory units (160, 185), which store program codes and data. The memories (160, 185) are connected to the processor (180) and store an operating system, applications, and general files.

The processor (155, 180) may also be referred to as a controller, a microcontroller, a microprocessor, a microcomputer, and so on. Meanwhile, the processor (155, 180) may be realized in the form of hardware or firmware, software, or in a combination of hardware, firmware, and/or software. In case of implementing the exemplary embodiment of the present invention in the form of hardware, ASICs (Application Specific Integrated Circuits), DSPs (Digital Signal Processors), DSPDs (Digital Signal Processing Devices), PLDs (Programmable Logic Devices), FPGAs (Field Programmable Gate Arrays), which are configured to perform the present invention, may be provided in the processor (155, 180). Meanwhile, in case of implementing the exemplary embodiments of the present invention in the form of firmware or software, the firmware or software may be configured to include modules, procedures, or functions performing the functions or operations of the present invention, and, the firmware or software, which is configured to be capable of performing the present invention, may be equipped inside the processor (155, 180) or may be stored in the memory (160, 185) and then operated by the processor (155, 180).

Layers of a wireless interface protocol between a wireless communication system (network) of the UE and the BS may be categorized into a first layer (L1), a second layer (L2), and a third layer (L3) based upon 3 lower layers of an OSI (open system interconnection) model, which is well-known in the communication system. A physical layer corresponds to the first layer and provides information transmission service through a physical channel. An RRC (Radio Resource Control) layer belongs to the third layer and provides control radio resources between the UE and the network. The UE and the BS may exchange RRC messages with the wireless communication network through the RRC layer.

The term base station, which is used in the specification, may also be referred to as a cell or sector in case of being used in a regional sense. A serving base station (or cell) may be viewed as a base station providing the conventional (or legacy) main services to the user equipment, and a serving base station (or cell) may perform transception (transmission/reception) of control information within a coordinated multiple transmission point. In this respect, the serving base station (or cell) may be referred to as an anchor base station (or cell) (anchor cell). Similarly, a neighboring base station may also be referred to as a neighboring cell that is being used in the regional sense.

Multiple Antenna (MIMO) System

Description will now be made on a MIMO system. MIMO (Multiple-Input Multiple-Output) corresponds to a method of using multiple transmission antennae and multiple reception antennae. Herein, by using this method, data transmission and reception efficiency may be enhanced. More specifically, by using multiple antennae in a transmitting end or receiving end of a wireless communication system, the capacity may be increased, and the performance may be enhanced. Hereinafter, in this document, MIMO may also be referred to as 'multiple antennae (or multi-antennae)'.

In the multiple antennae technology, the reception of one whole message does not depend upon a single antenna path. Instead, in the multiple antennae technology, data may be completed by combining (or merging) a plurality of fragments received from multiple antennae. When using the multiple antennae technology, a data transmission rate within a cell area having a specific size may be enhanced, or system coverage may be increased by ensuring a specific data transmission rate. Also, this technology may be broadly used in mobile communication terminals and relay stations. Furthermore, by using the multiple antennae technology, limitations in the transmission size that occur during the related art mobile communication, which uses a single antenna, may be overcome.

Figure 3:
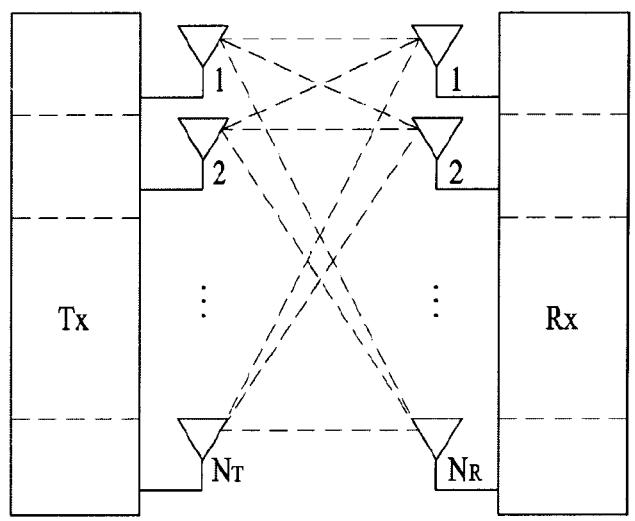
FIG. 3 illustrates a schematic view of a general multi-antenna (MIMO) communication system.

A schematic view showing the structure of a general multiple antenna (MIMO) communication system, which is described in the present invention, is shown in FIG. 3. Herein, $N_T$ number of transmission antennae is installed in the transmitting end, and $N_R$ number of reception antennae is installed in the receiving end. As described above, when both the transmitting end and the receiving end use multiple antennae, a theoretical channel transmission capacity may be more increased, as compared to when only either one of the transmitting end and the receiving end uses multiple antennae. The channel transmission capacity increases in proportion to the number of antennae. Therefore, the transmission rate may be enhanced, and a frequency rate may also be enhanced. If the maximum transmission rate when using a single antenna is referred to as $R_o$, theoretically, the transmission rate when using multiple antennae may be increased as much as the maximum transmission rate $R_o$ multiplied by a rate increase rate $R_i$, as shown in Equation 3. Herein, $R_i$ corresponds to a lower one the values $N_T$ and $N_R$.

$$R_i = \min(N_T, N_R) \qquad \text{[Equation 3]}$$

For example, in a MIMO communication system using 4 transmission antennae and 4 reception antennae, a theoretical transmission rate 4 times that of a single antenna system may be acquired. Evidence of such theoretical capacity increase of the multiple antennae system was found and proven in the mid 90's. And, since then, diverse technologies for actually enhancing the data transmission rate have been under research and development. And, among such technologies, some of the technologies are already being applied in diverse wireless communication standards, such as the $3^{rd}$ generation mobile communication and the next generation wireless LAN.

Up to the current time, the research and development associated to multiple antennae have been actively and diversely carried out in many aspects, such as research in the aspect of information theory associated to multiple antennae communication capacity calculation in diverse channel environments and multiple access environments, research in drawing out wireless channel measurements and models of a multiple antennae system, research in time/space signal processing technologies for enhancing transmission reliability and for enhancing the transmission rate, and so on.

In order to provide a more detailed description of the communication method in a multiple antennae system, a mathematical modeling of the communication method may be shown as follows. As shown in FIG. 3, it will be assumed that $N_T$ number of transmission antennae and $N_R$ number of reception antennae exist herein. First of all, in case of a transmitted signal (or transmission signal), since a maximum number of information available for transmission in equal to $N_T$, when $N_T$ number of transmission antennae exists, the transmission information may be indicated in the form of a vector as shown in Equation 4 below.

$$s = [s_1, s_2, \ldots, s_{N_T}]^T \qquad \text{[Equation 4]}$$

Meanwhile, a transmission power may vary for each of the transmission information $s_1, s_2, \ldots, s_{N_T}$. And, in this case, when each of the transmission power is referred to as $P_1, P_2, \ldots, P_{N_T}$, the transmission information having its transmission power adjusted may be expressed in a vector form as shown in Equation 5 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 5]}$$

Also, by using a diagonal matrix P of the transmission power, $\hat{s}$ may be indicated as shown in Equation 6 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 6]}$$

Meanwhile, consideration will be made on the configuration of $N_T$ number of transmitted signals $x_1, x_2, \ldots, x_{N_T}$ that are actually being transmitted, when a weight matrix W is applied to the information vector $\hat{s}$ having its transmission power adjusted. Herein, the weight matrix performs the role of adequately distributing transmission information to each antenna in accordance with the transmission channel status (or situation). Such transmitted signals $x_1, x_2, \ldots, x_{N_T}$ may be expressed as shown in Equation 7 by using the vector X. Herein, $w_{ij}$ represents a weight between an $i^{th}$ transmission antenna and a $j^{th}$ information. W is referred to as a Weight Matrix or a Precoding Matrix.

$$X = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 7]}$$

Generally, the physical meaning of a rank of a channel matrix may be defined as a maximum number of information, each being different from one another, that can be transmitted in a given channel. Therefore, since the rank of a channel matrix is defined as a minimum number, among the number of independent rows and independent columns, the rank of the matrix cannot be greater than the number of rows or the number of columns. For example, in a mathematical form, a rank (rank(H)) of channel matrix H is limited to the range shown in Equation 8.

$$\text{rank}(H) \le \min(N_T, N_R) \qquad \text{[Equation 8]}$$

Furthermore, it will also be said that each of the different information transmitted by using the multiple antennae technology is defined as a 'transmission stream' or simply a 'stream'. Such 'stream' may also be referred to as a 'Layer'. Evidently, the number of transmission streams cannot be greater than the rank of the channel having the maximum number for transmitting information, each set of information being different from one another. Therefore, the channel matrix H may be expressed as shown in Equation 9 below.

$$\# \text{ of streams} \le \text{rank}(H) \le \min(N_T, N_R) \qquad \text{[Equation 9]}$$

Herein, "# of streams" indicates the number of streams. Meanwhile, it shall be noted that one stream may be transmitted through at least one or more antennae.

Diverse methods for corresponding at least one or more streams to multiple antennae may exist. Such methods may hereinafter be described in accordance with the type of multiple antennae technology. In case one stream is transmitted by passing through multiple antennae, the method may correspond to a spatial diversity scheme. And, in case a plurality of streams is transmitted by passing through multiple antennae, the method may correspond to a spatial multiplexing scheme. Evidently, an intermediate method corresponding to a hybrid form of the spatial diversity scheme and the spatial multiplexing scheme may also exist.

Hereinafter, channel state information (CSI) reporting will be described. In the current LTE standard, two different types of transmission methods, such as an open-loop MIMO, which is operated without any channel information, and a closed-loop MIMO, which is operated based upon channel information, exist. Most particularly, in the closed-loop MIMO, in order to acquire multiplexing gain of the MIMO antennae, each of the base station and the user equipment may perform beamforming based upon the channel state information. In order to acquire the channel state information from the user equipment, the base station allocates a PUCCH (Physical Uplink Control CHannel) or a PUSCH (Physical Uplink Shared CHannel) and commands channel state information (CSI) respective to the downlink signal to be fed-back.

The CSI may be broadly divided into three difference information types, such as RI (Rank Indicator), PMI (Precoding Matrix Index), CQI (Channel Quality Indicator). First of all, as described above, the RI indicates rank information of a channel and signifies a number of streams that can be received by the user equipment through the same frequency-time resource. Additionally, since the RI is decided by long term fading of the channel, the RI may be fed-back to the base station at a generally longer interval as compared to PMI, CQI values.

Secondly, as a value reflecting spatial characteristics of the channel, the PMI indicates a precoding matrix index of the base station, which is preferred by the user equipment, based upon a metric reference, such as SINR. Finally, as a value indicating the intensity of a channel, CQI indicates a reception SINR, which may be gained when the base station generally uses the PMI.

In a more evolved communication system, such as a LTE-A standard, gaining of additional multi-user diversity by using MU-MIMO (multi-user MIMO) is added. Since interference between user equipments being multiplexed in an antenna domain exists in the MU-MIMO, an accuracy or inaccuracy of the CSI may cause significant influence not only on the user equipment that has reported the CSI but also on the interference of other user equipments that are being multiplexed. Therefore, a more accurate CSI reporting is being required in the MU-MIMO as compared to the SU-MIMO.

Accordingly, in the LTE-A standard, it has been decided to design a final PMI by dividing the final PMI into W1, which corresponds to a long term and/or WB (wideband) PMI, and W2, which corresponds to a short term and/or SB (sub-band) PMI.

As an example of a hierarchical codebook transformation method configuring a final PMI from the W1 and W2 information, a long-term covariance matrix of a channel may be used as shown below in Equation 10.

$$W = \text{norm}(W1\,W2) \quad \text{[Equation 10]}$$

In Equation 10, as a short term PMI, W2 corresponds to a codeword of a codebook, which is configured to reflect short term channel state information, and W corresponds to a codeword of a final codebook (in other words, a precoding matrix), and norm(A) signifies a matrix having the norm of each column in matrix A normalized to 1.

A detailed structure of the conventional W1 and W2 is shown below in Equation 11.

$$W1(i) = \begin{bmatrix} X_i & 0 \\ 0 & X_i \end{bmatrix}, \quad \text{[Equation 11]}$$

where $X_i$ is $Nt/2$ by $M$ matrix.

$$W2(j) = \overbrace{\begin{bmatrix} e_M^k & e_M^l & E_M^m \\ \alpha_j e_M^k & \beta_j e_M^l & \gamma_j e_M^m \end{bmatrix}}^{r\ columns} \text{(if rank} = r),$$

where $1 \leq k, l, m \leq M$ and $k, l, m$ are integer.

Herein, $N_T$ represents a number of transmission antennae, and M corresponds to a number of columns in matrix $X_i$ and signifies that a total of M number of candidate column vectors exist in the matrix $X_i$. Among M number of elements, as a column vector having $k^{th}$, $l^{th}$, and $m^{th}$ elements set to 1 and having the remaining elements set to 0, $e_M^k$, $e_M^l$ and $e_M^m$ respectively indicate $k^{th}$, $l^{th}$, and $m^{th}$ column vectors of $X_i$. Each of $\alpha_j$, $\beta_j$ and $\gamma_j$ corresponds to a complex value having a unit norm, and when $k^{th}$, $l^{th}$, and $m^{th}$ column vectors of matrix $X_i$ are selected, these indicate that phase rotation is applied to this column vector. As an integer greater than 0, i signifies a PMI index indicating W1. And, as an integer greater than 0, j signifies a PMI index indicating W2.

In Equation 11, in case cross polarized antennae are used, and in case a distance between the antennae is dense, for example, in case the distance between adjacent (or neighboring) antennae is less than or equal to a half of a signal wave, the structure of a codeword corresponds to a structure that is designed by reflecting generated correlation characteristics of the channel. In case of cross polarized antennas, the antennae may be divided into a horizontal antenna group and a vertical antenna group, and, herein, each antenna group has the characteristics of a ULA (uniform linear array) antenna, and the two antenna groups are co-located.

Therefore, the correlation between the antennae of each group has the same characteristic of linear phase increment, and the correlation between each antenna group has the characteristic of phase rotation. Eventually, since the codebook corresponds to a quantized value of the channel, the codebook is required to be designed by directly reflecting the characteristics of the channel. For simplicity in the description, Equation 12 shown below may be given as an example of a Rank 1 codeword, which is created to have the above-described structure.

$$W1(i) * W2(j) = \begin{bmatrix} X_i(k) \\ \alpha_j X_i(k) \end{bmatrix} \quad \text{[Equation 12]}$$

In Equation 12 shown above, the codeword is expressed as a $N_T$(number of transmission antennae)×1 vector, and the codeword is configured to have a structure of an upper vector $x_i(k)$ and a lower vector $\alpha_j x_i(k)$, and each of the upper vector and the lower vector respectively shows the correlation characteristics of the horizontal antenna group and the vertical antenna group. It will be advantageous to express $x_i(k)$ as a vector having a linear phase increment characteristic by reflecting the correlation characteristics between the antennae of each antenna group, and a DFT matrix may be used as a typical example.

Codebook based Precoding Method

In order to support multi-antennae transmission, precoding that can adequately distribute the transmission information to each antenna in accordance with the channel situation may be applied. The codebook based precoding method refers to a method, wherein the transmitting end and the receiving end decide a precoding matrix group in advance, wherein the receiving end (e.g., UE) measures channel information received from the transmitting end (e.g., base station) and then feeds-back to the transmitting end information on the precoding matrix that corresponds to the best-fitting precoding matrix (i.e., Precoding Matrix Index (PMI), and wherein the transmitting end applies the adequate precoding to the signal transmission based upon the PMI.

Since this corresponds to a method of selecting an adequate precoding matrix from a pre-decided (or pre-defined) precoding matrix group, although an optimal precoding is not always applied, this method is advantageous in that the feedback overhead can be reduced as compared to explicitly feeding-back optimal precoding information to the actual channel information.

Figure 4:
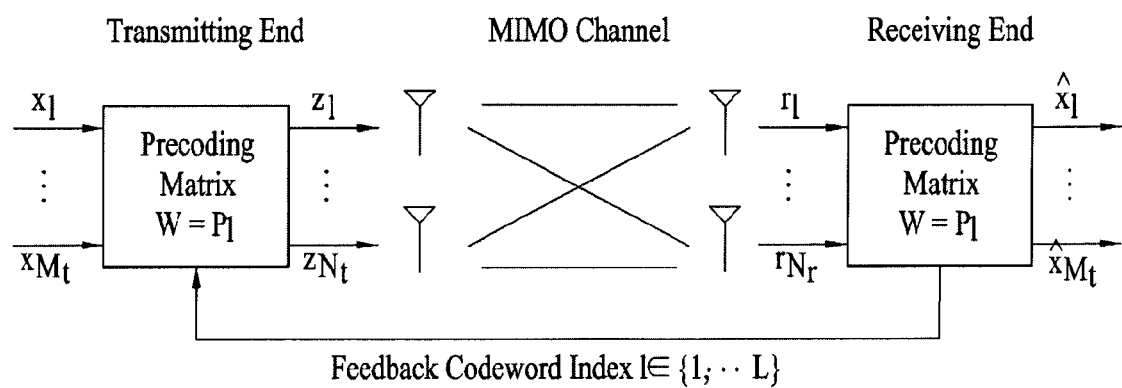
FIG. 4 illustrates a basic concept of codebook based precoding.
Figure 5A:
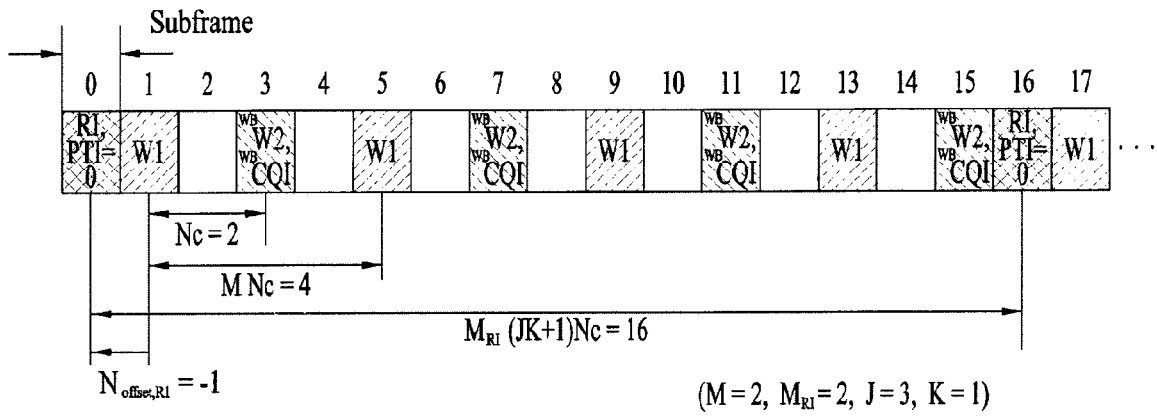
FIGS. 5(a) and 5(b) illustrate a periodic report on a channel status.
Figure 5B:
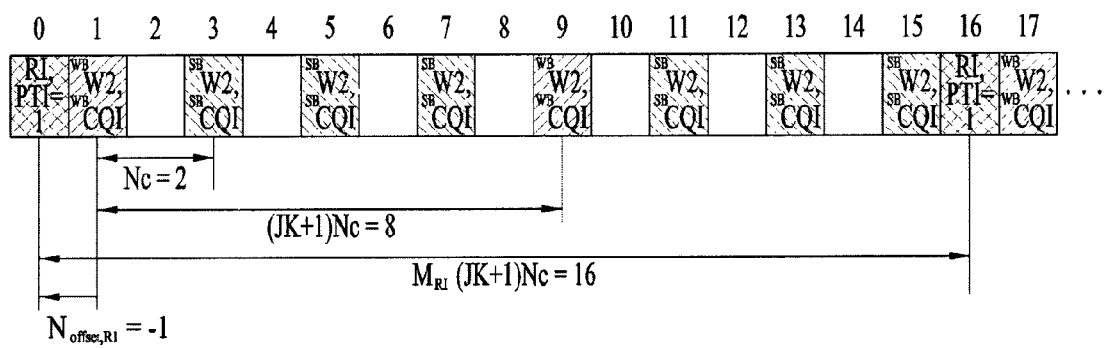
Figure 5B:
Figure 5B:
Figure 5B:
Figure 5B:
Figure 5B:

FIG. 4 illustrates a basic concept of codebook based precoding.

In case of following the codebook based precoding method, the transmitting end and the receiving end share codebook information, which includes a predetermined number of precoding matrices that are pre-decided in accordance with the transmission rank, number of antennae, and so on. More specifically, in case the feedback information is finite, the codebook based precoding method may be used. The receiving end may measure a channel status through the received signal and may, then, feed-back a finite number of precoding matrix information (i.e., index of a corresponding precoding matrix) to the transmitting end based upon the above-described codebook information. For example, the receiving end may select an optimal precoding matrix by measuring a reception signal by using a ML (Maximum Likelihood) or MMSE (Minimum Mean Square Error) method. In FIG. 4, although it is shown that the receiving end is transmitting precoding matrix information to the transmitting end with respect to each codeword, the present invention will not be required to be limited only to this.

After receiving the feedback information from the receiving end, the transmitting end may select a specific precoding matrix from the codebook based upon the received information. After selecting the precoding matrix, the transmitting end may perform precoding by using a method of multiplying a number of layer signals corresponding to the transmission rank by the selected precoding matrix, and, then, the transmitting end may transmit the transmission signal, which is processed with precoding, to the receiving end through multiple antennae. In the precoding matrix, the number of rows is equal to the number of antennae, and the number of columns is equal to the rank value. Since the rank value is equal to the number of layers, the number of columns is equal to the number of layers. For example, in case the number of transmission antennae is equal to 4, and in case the number of transmission layers is equal to 2, the precoding matrix may be configured as a 4×2 matrix. By using the precoding matrix, the information being transmitted through each of the layers may be respectively mapped to each antenna.

After receiving the signal, which is precoded and transmitted by the transmitting end, the receiving end may perform an inverse processing of the precoding, which was performed in the transmitting end, and may then recover the reception signal. Generally, since a precoding matrix satisfies a unitary matrix (U) condition, such as, $U*U^H=I$, the above-described inverse-processing of precoding may be realized by using a method of multiplying an Hermit matrix ($P^H$) of the precoding matrix (P), which is used in the precoding process of the transmitting end, by the reception signal.

For example, Table 1 shown below represents a codebook that is used for a downlink transmission by using 2 transmission antennae in 3GPP LTE Release-8/9, and Table 2 represents a codebook that is used for a downlink transmission by using 4 transmission antennae in 3GPP LTE Release-8/9.

TABLE 1

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 2, $W_n^{\{s\}}$ is obtained as set $\{s\}$, which is configured from an equation that is expressed as $W_n=I-2u_n u_n^H/u_n^H u_n$. At this point, I represents a 4×4 singular matrix, and $u_n$ corresponds to a value given in Table 2.

As shown in Table 1 presented above, a codebook respective to 2 transmission antennae has a total of 7 precoding vectors/matrices, and, herein, since the singular matrix is used for an open-loop system, a total of 6 precoding vectors/matrices are used for the precoding process in a closed loop system. Additionally, in case of a codebook respective to 4 transmission antennae, as shown in Table 2, the codebook has a total of 64 precoding vectors/matrices.

The above-described codebook has common properties, such as a Constant modulus (CM) property, a Nested property, a Constrained alphabet property, and so on. The CM property corresponds to a property, wherein each element of all precoding matrices included in the codebook does not include '0', and wherein each element is configured to have the same size. The Nested property signifies that a precoding matrix of a lower rank is designed to be configured as a subset of a specific column included in a precoding matrix of a higher rank. The Constrained alphabet property signifies that the alphabets of each element of all precoding matrices included in the codebook are configured of $$\left\{\pm 1, \pm j, \pm \frac{(1+j)}{\sqrt{2}}, \pm \frac{(-1+j)}{\sqrt{2}}\right\}.$$

In Table 2, $W_n^{\{s\}}$ is obtained as set $\{s\}$, which is configured from an equation that is expressed as $W_n=I-2u_n u_n^H/u_n^H u_n$. At this point, I represents a 4×4 singular matrix, and $u_n$ corresponds to a value given in Table 2.

As shown in Table 1 presented above, a codebook respective to 2 transmission antennae has a total of 7 precoding vectors/matrices, and, herein, since the singular matrix is used for an open-loop system, a total of 6 precoding vectors/matrices are used for the precoding process in a closed loop system. Additionally, in case of a codebook respective to 4 transmission antennae, as shown in Table 2, the codebook has a total of 64 precoding vectors/matrices.

The above-described codebook has common properties, such as a Constant modulus (CM) property, a Nested property, a Constrained alphabet property, and so on. The CM property corresponds to a property, wherein each element of all precoding matrices included in the codebook does not include '0', and wherein each element is configured to have the same size. The Nested property signifies that a precoding matrix of a lower rank is designed to be configured as a subset of a specific column included in a precoding matrix of a higher rank. The Constrained alphabet property signifies that the alphabets of each element of all precoding matrices included in the codebook are configured of $$\left\{\pm 1, \pm j, \pm \frac{(1+j)}{\sqrt{2}}, \pm \frac{(-1+j)}{\sqrt{2}}\right\}.$$

Feedback Channel Structure

Basically, in a FDD (Frequency Division Duplex) system, since the base station cannot know the information on a downlink channel, the channel information that is fed-back by the user equipment (UE) is used for the downlink transmission. In case of the legacy 3GPP LTE Release-8/9 system, the UE may feed-back downlink channel information through a PUCCH or may feed-back downlink channel information through a PUSCH. In case of the PUCCH, the channel information is fed-back periodically, and, in case of the PUSCH, the channel information is fed-back aperiodically. Additionally, the feedback of the channel information may feed-back the channel information respective to the entire frequency band (i.e., WideBand (WB)), and the feedback of the channel information may also feed-back channel information respective to a specific number of RBs (i.e., SubBand (SB)).

FIG. 5 illustrates an example of periodic reporting of the channel state information that is being discussed in the LTE-A system. When the base station has 8 transmission antennae, in case of Mode 2-1, a PTI (Precoder Type Indication) parameter corresponding to a 1-bit indicator is set up, and, in accordance with the PTI value, two different types of segmented periodic reporting modes are taken into consideration, as shown in the drawing. In the drawing, W1 and W2 indicate hierarchical codebooks, which are described above with reference to Equations 10-11. Once W1 and W2 are decided, the decided values are combined, so that a precoding matrix W having a completed structure can be decided.

Referring to FIG. 5, in case of periodic reporting, reports containing different content corresponding to Report 1, Report 2, and Report 3 are reported in accordance with different repetition (or iteration) cycle periods. Report 1 reports the RI and a 1-bit PTI value. Report 2 reports WB (WideBand) W1 (when PTI=0) or WB W2 and WB CQI (when PTI=1). And, Report 3 reports WB W2 and WB CQI (when PTI=0) or SB (Subband) W2 and SB CQI (when PTI=1).

Report 2 and Report 3 is transmitted from a subframe having the subframe index satisfying $(10*n_f+\text{floor}(n_s/2)-N_{offset,CQI})$ mod $(N_c)=0$ (hereinafter referred to as a first subframe set for simplicity). $N_{offset,CQI}$ corresponds to an offset value for the PMI/CQI transmission. And, $N_c$ indicates a subframe distance between neighboring Report 2 or Report 3. FIG. 5 illustrates an exemplary case when $N_{offset,CQI}=1$ and $N_c=2$, and the first subframe set is configured of subframes having odd-numbered indexes. $n_f$ indicates a system frame number (or radio frame index), and $n_s$ indicates a slot index within a radio frame. floor( ) indicates a decreasing function, and A mod B indicates a remainder from dividing A by B.

Report 2 is located within some of the subframes within the first subframe set, and Report 3 is located within the remaining subframes. More specifically, Report 2 is located within a subframe having a subframe index satisfying $(10*n_f+\text{floor}(n_s/2)-N_{offset,CQI})$ mod $(H*N_c)=0$. Accordingly, Report 2 is transmitted at an interval of $H*N_c$, and one or more first subframes located between the neighboring Report 2 are filled with Report 3 transmission. In case PTI=0 and H=M, M is decided by higher layer signaling. FIG. 5 illustrates an exemplary case when M=2. In case PMI=1, H=J*K+1, and K is decided by higher layer signaling, and J corresponds to a number of BPs (bandwidth parts). FIG. 5 illustrates an exemplary case when J=3 and K=1.

Report 1 is transmitted from a subframe having a subframe index satisfying $(10*n_f+\text{floor}(n_s/2)-N_{offset,CQI}-N_{offset,RI})$ mod $(M_{RI}*(J*K+1)*N_c)=0$, and $M_{RI}$ is decided by higher layer signaling. $N_{offset,RI}$ corresponds to a relative offset value for RI, and FIG. 5 illustrates an exemplary case when $M_{RI}=2$ and $N_{offset,RI}=-1$. Due to the value of $N_{offset,RI}=-1$, transmission time points of Report 1 and Report 2 do not overlap one another. When the user equipment calculates RI, W1, and W2 values, these values are calculated in correlation with one another. For example, W1 and W2 are calculated depending upon the RI value, and W2 is calculated depending upon W1. Following Report 1, at a time point when Report 2 and Report

3 are all reported, the base station may be capable of knowing the final W value from W1 and W2.

Extended Antenna configuration

Figure 6:
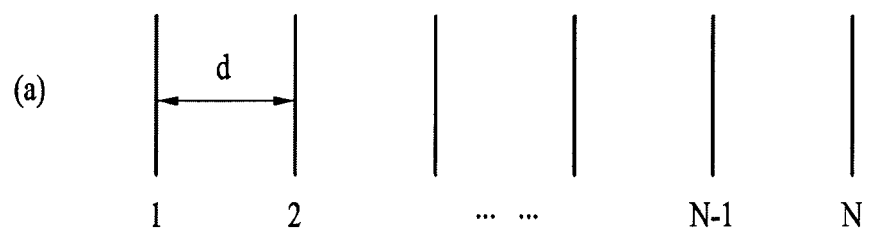
FIG. 6 illustrates examples for configuring 8 transmission antennae.
Figure 6:
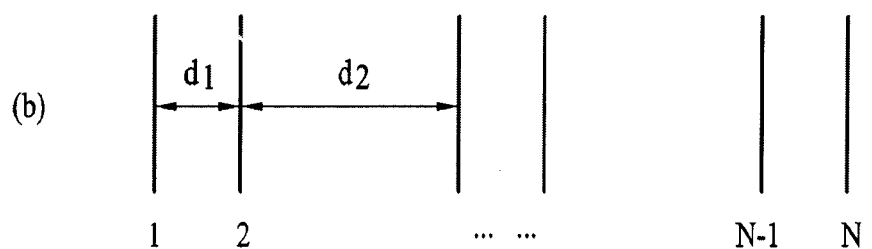
Figure 6:
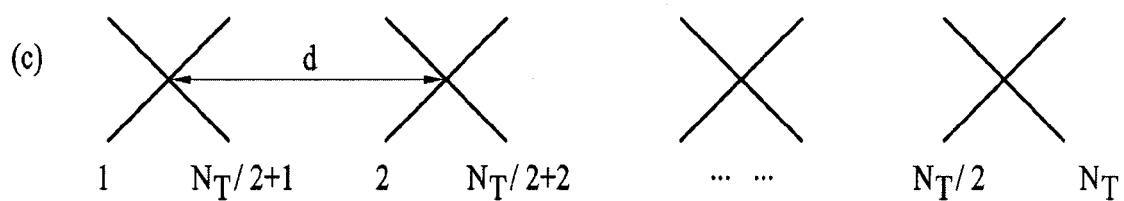

FIG. 6 illustrates examples for configuring 8 transmission antennae.

FIG. 6(*a*) illustrates a case when each of N number of antennae configures an independent channel without being grouped, and, this is generally referred to as ULA (Uniform Linear Array). As described above, by positioning multiple antennae to be spatially spaced apart from one another, the space of the transmitter and/or the receiver may not be sufficient for configuring independent channels.

FIG. 6(*b*) illustrates an antenna configuration of a ULA method, wherein two antennae form a pair (Paired ULA). In this case, a correlated channel is formed between the two antennae forming a pair, and this pair may have a channel that is independent from another pair of channels.

Meanwhile, as opposed to using 4 transmission antennae in a downlink in the legacy 3GPP LTE Release-8/9 system, in the 3GPP LTE Release-10 system, 8 transmission antennae may be used in a downlink. In order to apply such extended antenna configuration, since multiple transmission antennae are required to be installed in an insufficient space, the ULA antenna configuration shown in FIG. 6(*a*) and FIG. 6(*b*) may not be appropriate. Accordingly, a method of applying a dual-pole (or cross-pole) antenna configuration, as shown in FIG. 6(*c*), may be taken into consideration. In case of configuring the transmission antennae as described above, even if a distance d between the antennae becomes relatively shorter, by reducing the antenna correlation, high-yield data transmission may be performed.

Codebook Structures

As described above, by having the transmitting end and the receiving end share a pre-defined codebook, since an overhead that is required by the receiving end for feeding-back the precoding information, which is to be used for the MIMO transmission performed by the transmitting end, may be reduced, an efficient precoding may be applied.

As an example of configuring a pre-defined codebook, a precoder matrix may be configured by using a DFT (Discrete Fourier Transform) matrix or a Walsh matrix. Alternatively, diverse forms of precoders may be configured by being combined with a phase shift matrix or a phase shift diversity matrix.

In case of a co-polarization antenna group, DFT group codebooks have excellent performs, and, herein, in configuring a DFT matrix based codebook, a n×n matrix may be defined as shown below in Equation 13.

$$DFTn: D_n(k, l) = \frac{1}{\sqrt{n}}\exp(-j2\pi kl/n),$$ [Equation 13]
$$k, l = 0, 1, \ldots, n-1$$

With respect to a specific size n, only one matrix exists as the DFT matrix shown in Equation 13, which is presented above. Accordingly, in order to define various precoding matrices and to adequately use the defined matrices in accordance with the corresponding situation, a method of additionally configuring a rotated version of the DFTn matrix and using this rotated version may be taken into consideration. Equation 14 shown below represents an exemplary rotated DFTn matrix $$rotatedDFTn: D_n^{(G,g)}(k, l) =$$ [Equation 14]
$$\frac{1}{\sqrt{n}}\exp(-j2\pi k(l + g/G)/n),$$
$$k, l = 0, 1, \ldots, n-1, \quad g = 0, 1, \ldots, G.$$

In case of configuring a DFT matrix as shown above in Equation 14, G number of rotated DFTn matrices may be generated, and the generated matrices satisfy DFT matrix properties.

Hereinafter, a Householder-based codebook structure will be described in detail. A Householder-based codebook structure refers to a codebook that is configured of householder matrices. A Householder matrix corresponds to a matrix that is used for a Householder Transform, and a Householder Transform corresponds to a type of linear transformation, which may be used for performing QR decomposition. QR decomposition refers to decomposing a matrix into an orthogonal matrix (Q) and an upper triangular matrix (R). An upper triangular matrix refers to a square matrix, wherein all entries (or elements) below the main diagonal entries are equal to 0. An example of a 4×4 Householder matrix is as shown below in Equation 15.

$$M_1 =$$ [Equation 15]
$$I_4 - 2u_0 u_1^H / \|u_0\|^2 = \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$
$$u_0^T = [1 \ -1 \ -1 \ -1]$$

By performing the Householder Transform, a 4×4 unitary matrix having the CM property may be generated. As described above in the codebook for 4 transmission antennae shown in Table 2, n×n matrix is generated by using the Householder Transform, and the matrix may be configured to be used as a precoding matrix for a rank transmission lower than n by using a column subset of the generated precoding matrix.

Codebook for 8 Transmission Antennae

In a 3GPP LTE Release-10 system having an extended antenna configuration (e.g., 8 transmission antennae), the feedback method used in the legacy 3GPP LTE Release-8/9 system may be extended and applied. For example, Channel State Information (CSI), such as RI (Rank Indicator), PMI (Precoding Matrix Index), CQI (Channel Quality Information), and so on, may be fed-back. Hereinafter, a solution for designing a dual precoder based feedback codebook, which can be used in a system supporting the extended antenna configuration, will be described in detail. In the dual precoder based feedback codebook, in order to indicate a precoder that is to be used for the MIMO transmission of the transmitting end, the receiving end may transmit a precoding matrix index (PMI) to the transmitting end, and, herein, a precoding matrix may be indicated by a combination of two different PMIs. More specifically, the receiving end may feed-back to the transmitting end two different PMIs (i.e., a first PMI and a second PMI) to the transmitting end, and the transmitting end may decide a precoding matrix, which is indicated by the combination of the first PMI and the second PMI, and may then apply the decided precoding matrix to the MIMO transmission.

In designing the dual precoder based feedback codebook, 8 transmission antennae MIMO transmission, Single User-MIMO (SU-MIMO) and Multiple User-MIMO (MU-MIMO) support, suitability of diverse antennae configurations, codebook design standard, codebook size, and so on, may be taken into consideration.

As a codebook being applied to an 8 transmission antennae MIMO transmission, a method for designing a feedback codebook, which supports only SU-MIMO in case the transmission rank is greater than Rank 2, and which is optimized for both SU-MIMO and MU-MIMO in case the transmission rank is equal to or lower than Rank 2, and which is suitable (or adequate) for diverse antenna configurations may be taken into consideration.

With respect to MU-MIMO, it is preferable that the user equipments participating in the MU-MIMO are separated from one another in the correlation domain. Accordingly, a codebook for MU-MIMO is required to be designed to be correctly (or properly) operated in a channel having a high correlation. Since the DFT vectors provide satisfactory performance in channels having high correlation, it may be considered to include DFT vectors in a codebook group of up to Rank-2. Additionally, in a high scattering propagation environment (e.g., an indoor environment having a large amount of reflective waves, and so on), wherein a large number of spatial channels can be generated, SU-MIMO operations may be more appropriate as the MIMO transmission method. Therefore, a codebook for a rank higher than Rank-2 may be considered to be designed to have a satisfactory performance in separating multi-layers.

In designing a precoder for MIMO transmission, it will be preferable that one precoder structure is designed to have satisfactory performance with respect to various antenna configurations (low-correlation, high-correlation, Cross-polarization, and so on). In positioning the 8 transmission antennae, as a low-correlation antenna configuration, a Cross-polarization array having an antenna interval of 4λ may be configured, or, as a high-correlation configuration, a ULA having an antenna interval of 0.5λ may be configured, or, as a Cross-polarization antenna configuration, a Cross-polarization array having an antenna interval of 0.5λ may be configured. A DFT based codebook structure may provide satisfactory performance with respect to a high-correlation antenna configuration.

Meanwhile, with respect to the Cross-polarization antenna configuration, block diagonal matrices may be more adequate. Accordingly, in case a diagonal matrix is adopted to the codebook for 8 transmission antennae, a codebook providing satisfactory performance with respect to all antenna configurations may be configured.

As described above, the standard for a codebook design corresponds to satisfying a unitary codebook, a CM property, constrained alphabets, an adequate codebook size, a nested property, and so on. This has been applied to the 3GPP LTE Release-8/9 codebook design, and, it may also be considered to apply such codebook design standard with respect to the 3GPP LTE Release-10 codebook design, which supports an extended antenna configuration.

With respect to the codebook size, in order to sufficiently support the advantages of using 8 transmission antennae, it will be inevitable to increase the codebook size. In order to obtain sufficient precoding gain from the 8 transmission antennae in an environment having a low correlation, a large-sized codebook (e.g., a codebook exceeding the size of 4 bits with respect to Rank 1 and Rank 2) may be required. In an environment having a high correlation, in order to obtain precoding gain, a codebook having the size of 4 bits may be sufficient. However, in order to achieve multiplexing gain of MU-MIMO, the size of the codebook for Rank 1 and Rank 2 may be increased.

Based upon the description provided above, when the wireless communication system uses a transmit diversity system, the present invention proposes a method for performing feedback by effectively forming a group so that channels can be aligned along the same direction. The present invention is most particularly effective when the transmitter uses a massive antenna using an active antenna system (hereinafter referred to as AAS), and, as its main exemplary embodiment, this may be used in a downlink communication between the base station and the user equipment in a cellular network.

When the receiving end feeds-back information on a channel to the transmitting end, the present invention proposes a codebook structure that is required for feeding-back channel information or precoding information. For example, in a legacy LTE system (Release-10 and below), the channel information is defined as CSI, and the channel information has a structure of having the PMI, which corresponds to the precoding information among the CSI, be selected from the codebook and to be fed-back. Hereinafter, for simplicity in the description, the legacy LTE system will be defined as a wireless communication system corresponding to Release-10 or below.

In the legacy LTE system, a codebook for 8 antenna ports, a codeword is designed to be selected by two parameters, and, herein, each parameter may be individually selected as required. For example, the first parameter may be selected in order to represent a long-term channel, and the second parameter may be selected in order to represent a short-term channel, thereby generating a final codeword, and, alternatively, both of the two parameters may also be used to represent a long-term channel.

With the 3GPP LTE Standard Release-10, the PMI of the codebook for the 8 transmission antennae, which are used in the LTE system, is defined as shown below in Table 3 to Table 10. In Table 3 to Table 10, the values of $\varphi_n$ and $v_m$ are given as shown in Equation 16.

$$\varphi_n = e^{j\pi n/2} \qquad \text{[Equation 16]}$$

$$v_m = [1 \ e^{j2\pi m/32} \ e^{j4\pi m/32} \ e^{j6\pi m/32}]^T$$

Herein, the first PMI parameter $i_1$ is selected from $i_1 \in \{0, 1, \ldots, f(v)-1\}$, and the second PMI parameter $i_2$ is selected from $i_2 \in \{0, 1, \ldots, g(v)-1\}$. In case the RI (Rank Indicator) corresponds to v, the codeword (PMI) that is indicated by $i_1, i_2$, which correspond to parameters for PMI, are shown in the table corresponding to v among Table 3 to Table 10. In accordance with each rank, the values of $f(v) \in \{16, 16, 4, 4, 4, 4, 4, 1\}$ and $g(v) \in \{16, 16, 16, 8, 1, 1, 1, 1\}$ are defined.

Table 3 corresponds to a codebook for performing 1-layer channel status information reporting (CSI reporting) by using 8 antenna ports (i.e., antenna ports 15 to 22).

TABLE 3

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$ Table 4 corresponds to a codebook for performing 2-layer channel status information reporting (CSI reporting) by using 8 antenna ports (i.e., antenna ports 15 to 22).

TABLE 4

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| $i_1$ | $i_2$ | | | |
|---|---|---|---|---|
| | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| $i_1$ | $i_2$ | | | |
|---|---|---|---|---|
| | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ | | | |
|---|---|---|---|---|
| | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4} \begin{bmatrix} v_m & v_{m'} \\ \varphi_n v_m & -\varphi_n v_{m'} \end{bmatrix}$ Table 5 corresponds to a codebook for performing 3-layer channel status information reporting (CSI reporting) by using 8 antenna ports (i.e., antenna ports 15 to 22).

TABLE 5

| $i_1$ | $i_2$ | | | |
|---|---|---|---|---|
| | 0 | 1 | 2 | 3 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ | $\tilde{W}_{8i_1+8,8i_1,8i_1}^{(3)}$ |

| $i_1$ | $i_2$ | | | |
|---|---|---|---|---|
| | 4 | 5 | 6 | 7 |
| 0-3 | $W_{8i_1+2,8i_1+2,8i_1+10}^{(3)}$ | $W_{8i_1+10,8i_1+2,8i_1+10}^{(3)}$ | $\tilde{W}_{8i_1+2,8i_1+10,8i_1+10}^{(3)}$ | $\tilde{W}_{8i_1+10,8i_1+2,8i_1+2}^{(3)}$ |

| $i_1$ | $i_2$ | | | |
|---|---|---|---|---|
| | 8 | 9 | 10 | 11 |
| 0-3 | $W_{8i_1+4,8i_1+4,8i_1+12}^{(3)}$ | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |

TABLE 5-continued

| | $i_2$ | | | |
|---|---|---|---|---|
| $i_1$ | 12 | 13 | 14 | 15 |
| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ | $\tilde{W}_{8i_1+14,8i_1+6,8i_1+6}^{(3)}$ |

$$\text{where } W_{m,m',m''}^{(3)} = \frac{1}{\sqrt{24}} \begin{bmatrix} v_m & v_{m'} & v_{m''} \\ v_m & -v_{m'} & -v_{m''} \end{bmatrix},$$

$$\tilde{W}_{m,m',m''}^{(3)} = \frac{1}{\sqrt{24}} \begin{bmatrix} v_m & v_{m'} & v_{m''} \\ v_m & v_{m'} & -v_{m''} \end{bmatrix}$$

Table 6 corresponds to a codebook for performing 4-layer channel status information reporting (CSI reporting) by using 8 antenna ports (i.e., antenna ports 15 to 22).

TABLE 6

| | $i_2$ | | | |
|---|---|---|---|---|
| $i_1$ | 0 | 1 | 2 | 3 |
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(4)}$ |

| | $i_2$ | | | |
|---|---|---|---|---|
| $i_1$ | 4 | 5 | 6 | 7 |
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(4)}$ |

$$\text{where } W_{m,m',n}^{(4)} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$$

Table 7 corresponds to a codebook for performing 5-layer channel status information reporting (CSI reporting) by using 8 antenna ports (i.e., antenna ports 15 to 22).

TABLE 7

| | $i_2$ |
|---|---|
| $i_1$ | 0 |
| 0-3 | $W_{i_1}^{(5)} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

Table 8 corresponds to a codebook for performing 6-layer channel status information reporting (CSI reporting) by using 8 antenna ports (i.e., antenna ports 15 to 22).

TABLE 8

| | $i_2$ |
|---|---|
| $i_1$ | 0 |
| 0-3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

Table 9 corresponds to a codebook for performing 7-layer channel status information reporting (CSI reporting) by using 8 antenna ports (i.e., antenna ports 15 to 22).

TABLE 9

| | $i_2$ |
|---|---|
| $i_1$ | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

Table 10 corresponds to a codebook for performing 8-layer channel status information reporting (CSI reporting) by using 8 antenna ports (i.e., antenna ports 15 to 22).

TABLE 10

| | $i_2$ |
|---|---|
| $i_1$ | 0 |
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

Figure 7:
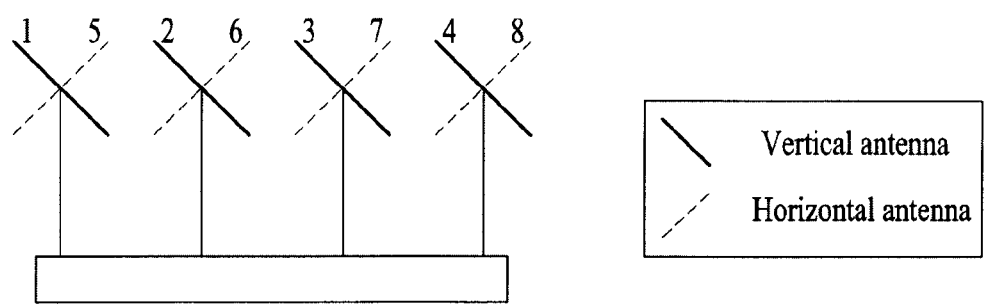
FIG. 7 illustrates an example of a cross-polarization antenna.

In the above-described codebook for 8 antenna ports (APs), $\phi_n$ of Equation 16 performs a function of adjusting a phase for the cross-polarization antennae. More specifically, in the description on the cross-polarization antennae with reference to FIG. 7, the antenna ports are assigned with indexes 1, 2, 3, 4, 5, 6, 7, and 8, and, as shown in FIG. 7, it will be assumed that Port Number 1 and Port Number 5 cross one another, that Port Number 2 and Port Number 6 cross one another, that Port Number 3 and Port Number 7 cross one another, and that Port Number 4 and Port Number 8 cross one another. In this case, phase adjustment between Port Numbers 1, 2, 3, and 4 and Port Numbers 5, 6, 7, and 8 is realized in accordance with $\phi_n$.

Additionally, in FIG. 7, the phase adjustment between port numbers 1, 2, 3, and 4 and the adjustment of phase between port numbers 5, 6, 7, and 8 is performed (or adjusted) by $v_m$ in Equation 16. In the codebook for 8 antenna ports, a codeword for the above-described phase adjustment is selected from a DFT matrix, wherein oversampling is set to 8 in a 4-dimensional matrix.

Accordingly, in the codebook that is designed as shown in Table 3 to Table 10, $i_1$ simultaneously indicates g (v) number of codewords, and by indicating multiple codewords instead of one final codeword, only the general information on the current channel may be included. For example, in case of Rank=1, as shown in Table 3, $i_1$ indicates 16 final codewords, and $i_2$ indicates only one final codeword among the 16 final codewords. Accordingly, in the codebook that is configured of such two parameters, when feeding-back $i_1$, calculation may be made based upon the wideband, and, when feeding-back $i_2$, calculation may be made based upon the subband. In this case, the feedback overhead may be remarkably reduced in the feedback amount respective to $i_1$, which is calculated based upon the wideband, as compared to the case of calculating $i_1$ based upon each subband.

A number of subbands for each feedback is set up for each system bandwidth, and, in case of feeding-back a PMI for each subband accordingly (i.e., a reporting mode wherein the PMI feedback type corresponds to a subband PMI), the feedback overhead varies in accordance with the number of subbands. If the number of subbands is given as N, the overhead respective to the PMI corresponds to $B_1+NB_2$. Herein, each of $B_1$ and $B_2$ indicates a number of feedback bits that is respectively required when feeding-back the two parameters $i_1$ and $i_2$ for the PMI.

More specifically, when the number of subbands is increased, the entire overhead is decided in correspondence to the size of $B_2$. The current LTE system is assigned with a maximum of 14 subbands, and, based upon this number of subbands, it may be known that a large amount of feedback overhead is assigned in accordance with the number of $B_2$.

Accordingly, the present invention proposes a codebook for reducing the feedback overhead respective to the number of subbands.

First of all, a solution for extensively applying a codebook for 8 transmission antennae to a codebook having a general antenna port in the legacy LTE system (a wireless communication system corresponding to 3GPP LTE Release-10 and below) may be taken into consideration. More specifically, as shown in Table 3 to Table 10, in case of Rank=3 or higher, the feedback amount is smaller as compared to the cases of Rank=1 and Rank=2.

Therefore, in the present invention, a case of applying Rank=1 and Rank=2, wherein the feedback amount is relatively large, will be described in detail. First of all, in ca codebook based upon 8 antenna ports, when codebooks corresponding to Rank=1 and Rank=2 are generally extensively applied in accordance with the number of antenna ports, each codebook may be respectively defined as shown in Table 11 and Table 12.

Table 11 corresponds to a codebook for a 1-layer channel status information reporting (CSI reporting) according to the present invention.

TABLE 11

| $i_1$ | $i_2$ | | | | | | | |
|---|---|---|---|---|---|---|---|---|
| | 0 | 1 | 2 | 3 | 4 | 5 | 6 | 7 |
| 0 ~ (L−1) | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |
| $i_1$ | $i_2$ | | | | | | | |
| | 8 | 9 | 10 | 11 | 12 | 13 | 14 | 15 |
| 0 ~ (L−1) | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$ Table 12 corresponds to a codebook for a 2-layer channel status information reporting (CSI reporting) according to the present invention.

TABLE 12

| $i_1$ | $i_2$ | | | |
|---|---|---|---|---|
| | 0 | 1 | 2 | 3 |
| 0~(L−1) | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |
| $i_1$ | $i_2$ | | | |
| | 4 | 5 | 6 | 7 |
| 0~(L−1) | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |
| $i_1$ | $i_2$ | | | |
| | 8 | 9 | 10 | 11 |
| 0~(L−1) | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |
| $i_1$ | $i_2$ | | | |
| | 12 | 13 | 14 | 15 |
| 0~(L−1) | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4} \begin{bmatrix} v_m & v_{m'} \\ \varphi_n v_m & -\varphi_n v_{m'} \end{bmatrix}$ In Table 11 and Table 12, each of the $\varphi_n$ and $v_m$ values follows Equation 17 in accordance with the number of antenna ports.

$$\varphi_n = e^{j\pi n/2} \quad\quad \text{[Equation 17]}$$

$$v_m = [\,1 \quad e^{j2\pi n/A} \quad \ldots \quad e^{j2\pi n(N_t/2-1)/A}\,]^T$$

In Equation 17, the value of A is given, as shown in Equation 18, in accordance with a number of transmission antenna ports (i.e., $N_t$) and a value of oversampling (i.e., a).

$$A = \frac{aN_t}{2} \quad\quad \text{[Equation 18]}$$

Table 11 and Table 12 respectively show cases when the value of a is fixed to 8, and when the value of L is as shown in Equation 19.

$$L = \frac{aN_t}{4} \quad\quad \text{[Equation 19]}$$

In Table 11 and Table 12, L signifies the size of $i_1$ in the codebook. Furthermore, even in a case when the oversampling value is given the value of a other than 8, the codebook proposed in the present invention may be applied. Herein, the value of $B_1$ (as shown in Table 11 and Table 12) is set to $$\log_2 \frac{aN_t}{4}$$

bits.

Accordingly, although the value of $B_1$ is linearly increased with respect to the log value of the number of antenna ports, the value of $B_2$ is set to 4 bits regardless of the number of antenna ports. Therefore, in case of Rank=1, 2 bits of $B_2$ will be used for adjusting the phase of the above-described cross polarization antenna, and the remaining 2 bits will be used for selecting one of the 4 DFT codewords. In case of Rank=2, 1 bit of $B_2$ will be used for adjusting the phase of the cross polarization antenna, and the remaining 3 bits will be used for selecting one of the 8 DFT codewords.

Additionally, based upon the value of $B_2$, the present invention present invention proposes a codebook that can reduce the feedback overhead, which is being increased by the number of subbands, in case of feeding-back the PMI for each subband.

Based upon the value of $B_2$, in case of Rank=1, which is proposed in the present invention, Table 13 represents a codebook that can reduce the feedback overhead when feeding-back the PMI for each subband.

TABLE 13

| | $i_2$ | | | |
|---|---|---|---|---|
| $i_1$ | 0 | 1 | 2 | 3 |
| 0 ~ (2L − 1) | $W^{(1)}_{2i_1',0,i_1''}$ | $W^{(1)}_{2i_1',1,i_1''}$ | $W^{(1)}_{2i_1'+1,0,i_1''}$ | $W^{(1)}_{2i_1'+1,1,i_1''}$ |

TABLE 13-continued

| | $i_2$ | | | |
|---|---|---|---|---|
| $i_1$ | 4 | 5 | 6 | 7 |
| 0 ~ (2L − 1) | $W^{(1)}_{2i_1'+2,0,i_1''}$ | $W^{(1)}_{2i_1'+2,1,i_1''}$ | $W^{(1)}_{2i_1'+3,0,i_1''}$ | $W^{(1)}_{2i_1'+3,1,i_1''}$ | where $i_1' = i_1 \bmod L$ $i_1'' = 2 \times \lfloor i_1/L \rfloor$ $W^{(1)}_{m,n,n'} = \frac{1}{\sqrt{8}} \begin{bmatrix} v_m \\ \varphi_n \varphi_{n'} v_m \end{bmatrix}$ More specifically, referring to Table 13, the value of $B_1$ has 1 more bit as compared to the codebook of Table 11, and, conversely, the value of $B_2$ has 1 less bit. Accordingly, the codebook that is proposed in the present invention uses the 1 feedback bit of $i_2$, which was used in the co-phase, by adding it to $i_1$.

Figure 8:
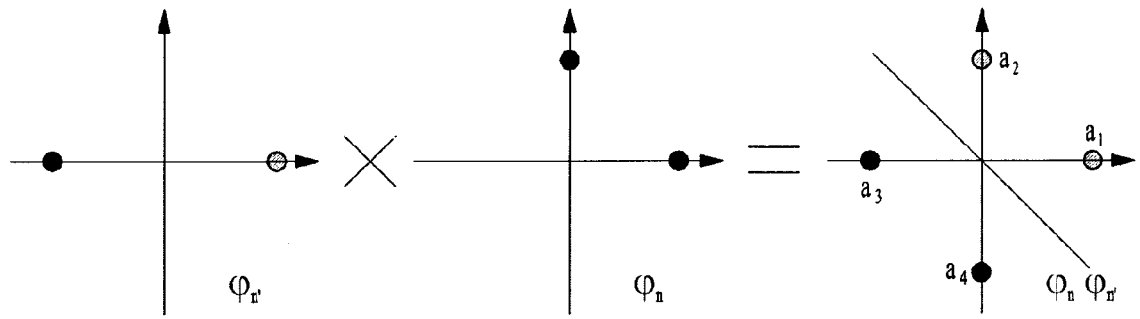
FIGS. 8-9 illustrate examples for applying the present invention in a cross-polarization antenna.

Referring to FIG. 8, in case of feeding-back a PMI of the subband according to the present invention, a codebook that can reduce the feedback overhead will be described in detail. The receiving end may select 1 or −1 as the value of $\varphi_n'$, which corresponds to a parameter for the co-phase for the cross polarization antenna, by using $i_1''$ and may then feed-back the selected value, and the receiving end may select 1 or j as the value of $\varphi_n$ by using $i_2$ and may then feed-back the selected value. Accordingly, the finally selected co-phase values may indicate any one of the values '1', 'j', '−1', and '−j'. More specifically, in case the value selected by $i_1''$ corresponds to '1', the final value may indicate '1' or 'j' (points $a_1$, $a_2$ in FIG. 8), and, in case the value selected by $i_1''$ corresponds to '−1', the final value may indicate '−1' or '−j' (points $a_3$, $a_4$ in FIG. 8). Therefore, the receiving end may feed-back an approximate value for the co-phase, and, then, the receiving end may select a more accurate value by using $i_2$ and may transmit the selected value.

Alternatively, in case of Rank=1, which is proposed in the present invention, a codebook that can reduce the feedback overhead when feeding-back the PMI for each subband may be defined as shown in Table 14.

TABLE 14

| | $i_2$ | | | |
|---|---|---|---|---|
| $i_1$ | 0 | 1 | 2 | 3 |
| 0 ~ (4L − 1) | $W^{(1)}_{2i_1',0,i_1''}$ | $W^{(1)}_{2i_1',1,i_1''}$ | $W^{(1)}_{2i_1'+1,0,i_1''}$ | $W^{(1)}_{2i_1'+1,1,i_1''}$ |

| | $i_2$ | | | |
|---|---|---|---|---|
| $i_1$ | 4 | 5 | 6 | 7 |
| 0 ~ (4L − 1) | $W^{(1)}_{2i_1'+2,0,i_1''}$ | $W^{(1)}_{2i_1'+2,1,i_1''}$ | $W^{(1)}_{2i_1'+3,0,i_1''}$ | $W^{(1)}_{2i_1'+3,1,i_1''}$ | where $i_1' = i_1 \bmod L$ $i_1'' = \lfloor i_1/L \rfloor$ $W^{(1)}_{m,n,n'} = \frac{1}{\sqrt{8}} \begin{bmatrix} v_m \\ \varphi_n \varphi_{n'} v_m \end{bmatrix}$ As shown in Table 14, the value of $B_1$ has 2 more bits as compared to the codebook of Table 11, and, conversely, the value of $B_2$ has 1 less bit. More specifically, in the codebook shown Table 14, 1 more bit of the feedback overhead respective to $B_1$ is increased as compared to the codebook of Table 13. The increased bit may increase the range of values selected for the co-phase in the wideband.

According to the description of the codebook according to Table 14 with reference to FIG. 8, in case a phase difference of the channel actually exists between 0 degree to 90 degrees, the receiving end may select 1 as the value of $\phi_n'$. Thereafter, in accordance with a change in the channel, the receiving end may select 1 or j as the value of $\phi_n$. However, in case of the codebook proposed in Table 13, in case the channel phase exists between 90 degrees and 180 degrees, there may occur a problem in selecting the value of $\phi_n'$. Most particularly, in case the channel is placed near 135 degrees (near the diagonal line in FIG. 8), even if the receiving end select 1 or −1 as the value of $\phi_n'$, it will be highly likely that the channel shifts to another domain (or region) (based upon the dotted line of FIG. 8, the other domain may be differentiated as a region including $a_1$, $a_2$ and a region including $a_3$, $a_4$). In order to resolve this problem, in the present invention, the value of $\phi_n'$ may be selected from $\{1, j, -1, -j\}$, as shown in Equation 14. In this case, in case the value of $\phi_n'$ is equal to 1, this signifies that the final phase value is equal to 1 or j, and, in case the value of $\phi_n'$ is equal to j, this signifies that the final phase value is equal to j or −1, and, in case the value of $\phi_n'$ is equal to −1, this signifies that the final phase value is equal to −1 or −j, and, in case the value of $\phi_n'$ is equal to −j, this signifies that the final phase value is equal to −j or 1. Accordingly, in case ht phase value is approximate to 135 degrees, j may be selected as the value of $\phi_n'$, thereby being capable of resolving the problem mentioned above.

Additionally, in case of Rank=2, the present invention proposes a codebook for reducing the feedback overhead when feeding-back the PMI of a subband, as shown in Table 15.

TABLE 15

| $i_1$ | $i_2$ | | | |
|---|---|---|---|---|
| | 0 | 1 | 2 | 3 |
| 0 ~ (2L − 1) | $W^{(2)}_{2i_1,2i_1,i_1''}$ | $W^{(2)}_{2i_1+1,2i_1+1,i_1''}$ | $W^{(2)}_{2i_1+2,2i_1+2,i_1''}$ | $W^{(2)}_{2i_1+3,2i_1+3,i_1''}$ |

| $i_1$ | $i_2$ | | | |
|---|---|---|---|---|
| | 4 | 5 | 6 | 7 |
| 0 ~ (2L − 1) | $W^{(2)}_{2i_1,2i_1+1,i_1''}$ | $W^{(2)}_{2i_1+1,2i_1+2,i_1''}$ | $W^{(2)}_{2i_1,2i_1+3,i_1''}$ | $W^{(2)}_{2i_1+1,2i_1+3,i_1''}$ | where $i_1' = i_1 \bmod L$ $i_1'' = 2 \times \lfloor i_1 / L \rfloor$ $W^{(2)}_{m,n,n'} = \frac{1}{4}\begin{bmatrix} v_m & v_{m'} \\ \varphi_n v_m & -\varphi_n v_{m'} \end{bmatrix}$ As shown in Table 15, the value of $B_1$ has 1 more bit as compared to the codebook of Table 12, and, conversely, the value of $B_2$ has 1 less bit. In the codebook, which is defined as shown in Table 15, the codebook is defined to use the 1 feedback bit of $i_2$, which was used in the co-phase, by adding it to $i_1$. In case of Rank=2, since all of the feedback used for the co-phase corresponds to only 1 bit, the value for all co-phase may be selected and fed-back by using $i_1$.

Accordingly, in case of feeding-back the PMI for each subband, the codebook proposed in the present invention has an advantage of reducing the feedback overhead. More specifically, when it is assumed that a value of $i_1$ is fed-back for the wideband, and when it is assumed that value of $i_2$ is being fed-back for each subband, as described above, the overhead respective to the PMI follows $B_1 + NB_2$. However, according to the present invention, although the feedback amount for the wideband is increased by 1 bit, the feedback amount for the subband is decreased by N bits. Therefore, in case of Rank=1, in case of using the codebook defined in Table 13, the total feedback amount is decreased by N−1 bits, and, in case of using the codebook defined in Table 14, the total feedback amount is decreased by N−2 bits. Furthermore, according to the present invention, as the number of subbands becomes larger, the decreased amount of feedback overhead increases.

A case when the co-phase values are independent from one another for each feedback is assumed in the above-described exemplary embodiments of the present invention. More specifically, according to the present invention, for each feedback, the receiving end transmits a new feedback value related to the co-phase value with respect to each feedback without considering the feedback that was previously transmitted.

Hereinafter, a codebook, which is defined to be capable of transmitting a corrected feedback value based upon an already-transmitted feedback value when transmitting feedback values will be described in detail, and this codebook may be additionally applied to the above-described present invention. First of all, it will be assumed that $\phi_n = e^{j\pi n/2}$, which is defined in the above-described codebook (i.e., the codebook defined in Table 11 to Table 15), corresponds to the co-phase value that is to be fed-back by the receiving end. And, if it is assumed in the present invention that two parameters $i_1$, $i_2$ are being used in order to feed-back this value, configuration may be made so that parameters $\alpha_1$, $\alpha_2$ indicating the co-phase are respectively included in a portion where the two parameters are configured. More specifically, in case the receiving end feeds-back $i_1$, $i_2$, the transmitting end may be capable of knowing the information on $\alpha_1$, $\alpha_2$, which respectively correspond to a portion configuring the parameters $i_1$, $i_2$.

More specifically, the above-described $\alpha_1$ represents a step size, and $\alpha_2$ indicates a direction. And, since both parameters corresponds to information on a phase value, $\alpha_1 \in [0, 2\pi]$, and $\alpha_2$ represents the direction, e.g., whether or not the direction corresponds to a 'clockwise direction' or a 'counter-clockwise direction'.

Figure 9:
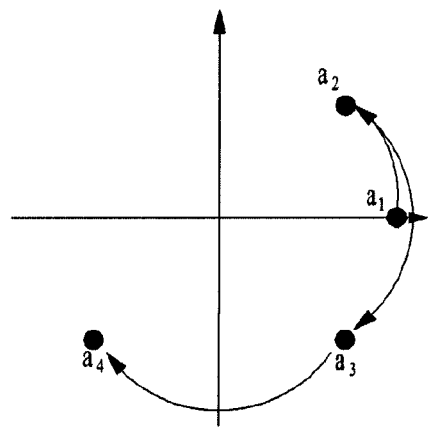

When describing the exemplary embodiment of the present invention with reference to FIG. 9, the receiving end configures $\alpha_1$ as a reference point respective to the co-phase value. First of all, after feeding-back the information on $\alpha_1$ as $\pi/4$, the receiving end feeds-back the information on $\alpha_2$ as the 'counter-clockwise direction'. Accordingly, the transmitting end (e.g., base station) determines that the current co-phase value correspond to a half of the $\alpha_2$ point.

Herein, after feeding-back the information on $\alpha_1$ as $\pi/4$, the receiving end feeds-back the information on $\alpha_2$ as the 'clockwise direction'. In this case, the transmitting end (e.g., base station) applies the currently received $\alpha_1$, $\alpha_2$ based upon the previous point $\alpha_2$. Accordingly, the transmitting end determines point $\alpha_3$ as the current co-phase value. In case the receiving end feeds-back only $\alpha_2$ without feeding-back the value of $\alpha_1$, the transmitting end determines the previous $\alpha_1$ value as $\alpha_1$, and, by applying the newly received 'clockwise direction' of $\alpha_2$, the transmitting end may determine point $\alpha_4$ as the current co-phase value. Furthermore, information on a group or list, and so on, of values that can be configured as the reference point (i.e., $\alpha_1$) respective to the co-phase value may be shared in advance by the transmitting end and the receiving end, and the transmitting end may inform such information to the receiving end through higher layer signaling (e.g., RRC signaling).

Although the above-described codebook of the present invention has been described as a feedback in the PUSCH mode, which corresponds to an aperiodic feedback, in the current LTE system (i.e., 3GPP LTE release-10 and below), the present invention may also be applied to a case when feedback is being performed in the PUCCH mode, which corresponds to periodic feedback.

Figure 10:
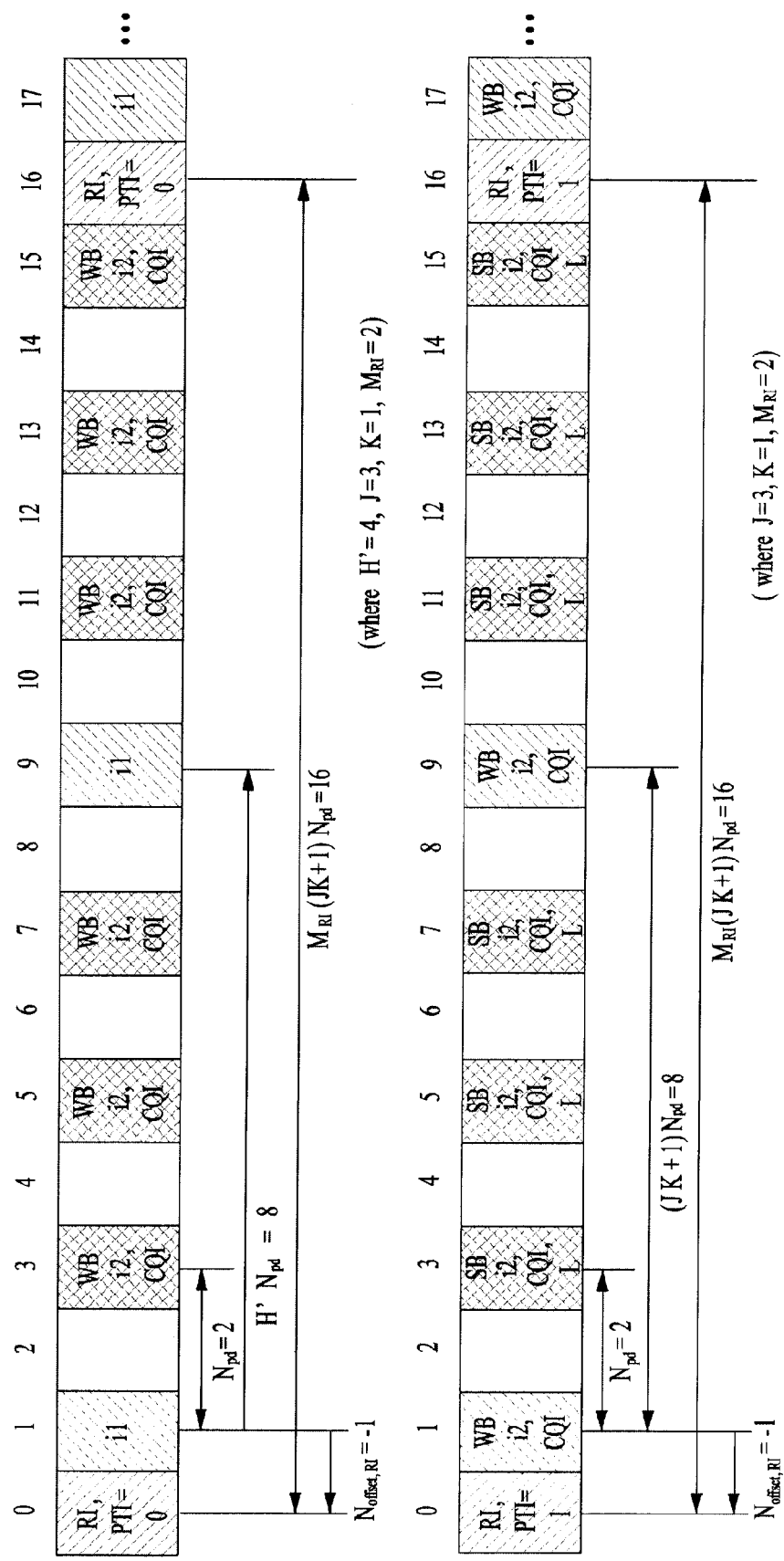
FIG. 10 illustrates an example of applying the present invention in the periodic report mode on the channel status.

FIG. 10 illustrates an extended exemplary embodiment of the present invention based upon a PUCCH feedback mode 2-1 of the current LTE standard (i.e., Release 10) considering 8 antennae. Content that is fed-back according to the present invention in the format, which is described above with reference to FIG. 5, will be described herein, and the description that overlaps with the description of FIG. 5 will be replaced with the description provided above for simplicity.

In FIG. 10, $i_1$ is positioned in some of the subframes included in the subframe set, and $i_2$ is positioned in the remaining subframes. More specifically, $i_1$ is positioned within a subframe corresponding to a parameter ($B_1$), wherein the subframe index is incremented (or increased) by 1 bit as compared to the PUCCH feedback mode 2-1 of the current LTE standard. Accordingly, $i_1$ is transmitted at each interval of $H'^* N_{pd}$, and one or more subframes existing between neighboring $i_1$ may be filled with $i_2$ transmission. In case PTI=0, H'=M, and M is determined by higher layer signaling. FIG. 10 illustrates an exemplary case of an increase of M=4 according to the present invention. In case PTI=1, H=J*K+1, and K is determined by higher layer signaling, and J represents a number of BPs (bandwidth parts). FIG. 10 illustrates an exemplary case when J=3 and K=1.

$i_1$ is transmitted from a subframe corresponding to a parameter ($B_1$), wherein the subframe index is incremented (or increased) by 1 bit as compared to the PUCCH feedback mode 2-1 of the current LTE standard, and $M_{RI}$ is determined by higher layer signaling. $N_{offset,RI}$ represents a relative offset value for RI, and FIG. 10 illustrates an exemplary case when $M_{RI}$=2 and $N_{offset,RI}$=−1. Due to $N_{offset,RI}$=−1, the transmission points of $i_1$ and $i_2$ do not overlap one another. When the user equipment (UE) calculates the RI, W1, and W2 values, theses values are calculated in correlation with one another. For example, W1 and W2 are calculated depending upon the RI value. And, at a time point when both $i_1$ and $i_2$ are reported, the base station may be capable of knowing the final W value based upon W1 and W2.

Accordingly, although a subband PMI does not exist in the PUCCH feedback, the PUCCH feedback may be used based upon the wideband PMI respective to $i_1$, $i_2$. Most particularly, in case the co-phase is applied to be fed-back based upon the previous phase value, the PUCCH feedback mode shown in FIG. 10 is advantageous in that the co-phase may be corrected in accordance with the time.

The codebook for 8 antenna ports, which is used in the legacy LTE system (i.e., 3GPP LTE release-10 and below) according to the present invention, may be applied to both the co-polarization antenna and the cross-polarization antenna. More specifically, the value of $v_m$, which is defined in Table 3 to Table 15, has the property of the co-polarization antenna, wherein the phases of the elements within the vector are linearly incremented (or increased), and the value of $\phi_n$ is defined as a term for indicating a phase difference between the vertical antennae and the horizontal antennae within the cross-polarization antenna.

However, the codebook defined in Table 3 to Table 15 of the present invention may also be modified in order to accurately conform with the properties of co-polarization antenna. The codeword that is finally selected in Table 13 has the same format as Equation 20.

$$W_{m,n}^{(1)} = \frac{1}{\sqrt{8}} \begin{bmatrix} v_m \\ \varphi_n v_m \end{bmatrix} \quad \text{[Equation 20]}$$

More specifically, in Equation 20, although the $v_m$ part maintains the co-polarization antenna property due to a linear increase in the phase of the elements within the vector, the phase difference between $v_m$ and $\phi_n v_m$ generates a structure that breaks the linearity. Accordingly, due to a failure in maintaining the linearity within the final codeword, the overall performance of the system may be degraded.

Therefore, the present invention proposes a codebook that can reduce additional feedback overhead while additionally maintaining the property of linearity in the co-polarization antenna.

More specifically, the codebook proposed in the present invention is converted to a codebook best-fitting the co-polarization antenna system by collectively increasing (or incrementing) $\phi_n v_m$ of Equation 20 by $\chi_m = e^{j\pi m N_t/4}$. When the converted codebook is converted, it is as shown in Equation 21.

$$W_{m,n}^{(1)} = \frac{1}{\sqrt{8}} \begin{bmatrix} v_m \\ \varphi_n \chi_m v_m \end{bmatrix} \quad \text{[Equation 21]}$$

In case of a codebook shown in Equation 21, since m corresponds to a value that is already selected by $i_1$, it may be known that there is no additional feedback respective to $\chi_m$. If the phase is increased (or incremented), as shown in Equation 21, in Table 11 and Table 12, this may be represented as shown below in Table 16 and Table 17.

Table 16 represents a codebook corresponding to the codebook defined in Table 11, wherein the phase has been increased to best fit the co-polarization antenna system.

TABLE 16

| | $i_2$ | | | | | | | |
|---|---|---|---|---|---|---|---|---|
| $i_1$ | 0 | 1 | 2 | 3 | 4 | 5 | 6 | 7 |
| $0 \sim (L-1)$ | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| | $i_2$ | | | | | | | |
|---|---|---|---|---|---|---|---|---|
| $i_1$ | 8 | 9 | 10 | 11 | 12 | 13 | 14 | 15 |
| $0 \sim (L-1)$ | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \dfrac{1}{\sqrt{8}} \begin{bmatrix} v_m \\ \varphi_n \chi_m v_m \end{bmatrix}$ Table 17 represents a codebook corresponding to the codebook defined in Table 12, wherein the phase has been increased to best fit the co-polarization antenna system.

TABLE 17

| | $i_2$ | | | |
|---|---|---|---|---|
| $i_1$ | 0 | 1 | 2 | 3 |
| $0 \sim (L-1)$ | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| | $i_2$ | | |
|---|---|---|---|
| $i_1$ | 4 | 5 | 6 |
| $0 \sim (L-1)$ | $W_{2i_1+2,2i_1+2,0}^{(2)}$ | $W_{2i_1+2,2i_1+2,1}^{(2)}$ | $W_{2i_1+3,2i_1+3,0}^{(2)}$ |

| | $i_2$ | | |
|---|---|---|---|
| $i_1$ | 7 | 8 | 9 |
| $0 \sim (L-1)$ | $W_{2i_1+3,2i_1+3,1}^{(2)}$ | $W_{2i_1,2i_1+1,0}^{(2)}$ | $W_{2i_1,2i_1+1,1}^{(2)}$ |

| | $i_2$ | | |
|---|---|---|---|
| $i_1$ | 10 | 11 | 12 |
| $0 \sim (L-1)$ | $W_{2i_1+1,2i_1+2,0}^{(2)}$ | $W_{2i_1+1,2i_1+2,1}^{(2)}$ | $W_{2i_1,2i_1+3,0}^{(2)}$ |

| | $i_2$ | | |
|---|---|---|---|
| $i_1$ | 13 | 14 | 15 |
| $0 \sim (L-1)$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \dfrac{1}{4} \begin{bmatrix} v_m & v_{m'} \\ \varphi_n \chi_m v_m & -\varphi_n \chi_{m'} v_{m'} \end{bmatrix}$ Additionally, if the phase is increased (or incremented), as shown in Equation 21, in Table 11 and Table 12, this may be represented as shown below in Table 18 to Table 20.

Table 18 represents a codebook corresponding to the codebook defined in Table 13, wherein the phase has been increased to best fit the co-polarization antenna system.

TABLE 18

| $i_1$ | $i_2$ | | | |
|---|---|---|---|---|
| | 0 | 1 | 2 | 3 |
| 0 ~ (2L − 1) | $W_{2i_1',0,i_1''}^{(1)}$ | $W_{2i_1',1,i_1''}^{(1)}$ | $W_{2i_1'+1,0,i_1''}^{(1)}$ | $W_{2i_1'+1,1,i_1''}^{(1)}$ |

| $i_1$ | $i_2$ | | | |
|---|---|---|---|---|
| | 4 | 5 | 6 | 7 |
| 0 ~ (2L − 1) | $W_{2i_1'+2,0,i_1''}^{(1)}$ | $W_{2i_1'+2,1,i_1''}^{(1)}$ | $W_{2i_1'+3,0,i_1''}^{(1)}$ | $W_{2i_1'+3,1,i_1''}^{(1)}$ | where $i_1' = i_1 \bmod L$ $i_1'' = 2 \times \lfloor i_1/L \rfloor$ $W_{m,n,n'}^{(1)} = \frac{1}{\sqrt{8}} \begin{bmatrix} v_m \\ \varphi_n \varphi_{n'} \chi_m v_m \end{bmatrix}$ Table 19 represents a codebook corresponding to the codebook defined in Table 14, wherein the phase has been increased to best fit the co-polarization antenna system.

TABLE 19

| $i_1$ | $i_2$ | | | |
|---|---|---|---|---|
| | 0 | 1 | 2 | 3 |
| 0 ~ (4L − 1) | $W_{2i_1',0,i_1''}^{(1)}$ | $W_{2i_1',1,i_1''}^{(1)}$ | $W_{2i_1'+1,0,i_1''}^{(1)}$ | $W_{2i_1'+1,1,i_1''}^{(1)}$ |

| $i_1$ | $i_2$ | | | |
|---|---|---|---|---|
| | 4 | 5 | 6 | 7 |
| 0 ~ (4L − 1) | $W_{2i_1'+2,0,i_1''}^{(1)}$ | $W_{2i_1'+2,1,i_1''}^{(1)}$ | $W_{2i_1'+3,0,i_1''}^{(1)}$ | $W_{2i_1'+3,1,i_1''}^{(1)}$ | where $i_1' = i_1 \bmod L$ $i_1'' = \lfloor i_1/L \rfloor$ $W_{m,n,n'}^{(1)} = \frac{1}{\sqrt{8}} \begin{bmatrix} v_m \\ \varphi_n \varphi_{n'} \chi_m v_m \end{bmatrix}$ Table 20 represents a codebook corresponding to the codebook defined in Table 15, wherein the phase has been increased to best fit the co-polarization antenna system.

TABLE 20

| $i_1$ | $i_2$ | | | |
|---|---|---|---|---|
| | 0 | 1 | 2 | 3 |
| 0 ~ (2L − 1) | $W_{2i_1,2i_1,i_1''}^{(2)}$ | $W_{2i_1+1,2i_1,i_1''}^{(2)}$ | $W_{2i_1+2,2i_1,i_1''}^{(2)}$ | $W_{2i_1+2,2i_1,i_1''}^{(2)}$ |

TABLE 20-continued

| $i_1$ | $i_2$ | | | |
|---|---|---|---|---|
| | 4 | 5 | 6 | 7 |
| 0 ~ (2L − 1) | $W_{2i_1,2i_1+1,i_1''}^{(2)}$ | $W_{2i_1+1,2i_1+2,i_1''}^{(2)}$ | $W_{2i_1,2i_1+3,i_1''}^{(2)}$ | $W_{2i_1+1,2i_1+3,i_1''}^{(2)}$ | where $i_1' = i_1 \bmod L$ $i_1'' = 2 \times \lfloor i_1/L \rfloor$ $W_{m,m',n}^{(2)} = \frac{1}{4} \begin{bmatrix} v_m & v_{m'} \\ \varphi_n \chi_m v_m & -\varphi_n \chi_{m'} v_{m'} \end{bmatrix}$ The codebooks that are defined in Table 16 to Table 20 more preferably reflect the properties of the co-polarization antenna, and such codebooks are advantageous in that there is no additional feedback. Moreover, such codebooks are also advantageous in that the newly added value of $\chi_m$ does not degrade the performance of the codebook for the conventional cross-polarization antenna. In case of the cross-polarization antenna, even though the phase difference between the horizontal antenna and the vertical antenna is indicated as $\varphi_n \chi_m$ instead of $\varphi_n$, this will not cause a critical problem in a long-term channel. More specifically, since the phase difference is not set to a specific angle, and since the phase difference is uniformly distributed, $\chi_m$ does not cause any influence on the performance.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In this document, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. The term base station may be replaced by other terms, such as fixed station, Node B, eNode B (eNB), Access Point (AP), and so on.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor.

The memory may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

Although the above-described efficient feedback transmission method in a multi-antenna wireless communication system and device for the same are described based upon an example being applied to the 3GPP LTE system, the present invention may also be applied to various wireless communication systems, in addition to the 3GPP LTE system, by using the same method.

What is claimed is:

1. A method for performing, by a User Equipment (UE), feedback channel state information with respect to a downlink transmission in a wireless communication system supporting multiple antennae, the method comprising:
transmitting a first precoding matrix index (PMI) and a second PMI for each sub-band,
wherein a precoding matrix preferred by the UE is constructed by combining the first PMI and the second PMI, and
wherein a precoding codebook in which a portion of a plurality of bits forming the second PMI is additionally used to form the first PMI, wherein the precoding codebook with respect to Rank 1 is configured as follows:

| $i_1$ | $i_2$ | | | |
|---|---|---|---|---|
| | 0 | 1 | 2 | 3 |
| $0 \sim (2L-1)$ | $W_{2i_1',0,i_1''}^{(1)}$ | $W_{2i_1',1,i_1''}^{(1)}$ | $W_{2i_1'+1,0,i_1''}^{(1)}$ | $W_{2i_1'+1,1,i_1''}^{(1)}$ |

| $i_1$ | $i_2$ | | | |
|---|---|---|---|---|
| | 4 | 5 | 6 | 7 |
| $0 \sim (2L-1)$ | $W_{2i_1'+2,0,i_1''}^{(1)}$ | $W_{2i_1'+2,1,i_1''}^{(1)}$ | $W_{2i_1'+3,0,i_1''}^{(1)}$ | $W_{2i_1'+3,1,i_1''}^{(1)}$ | where $i_2' = i_1 \bmod L$
$i_1'' = 2 \times \lfloor i_1/L \rfloor$ $$W_{m,n,n'}^{(1)} = \frac{1}{\sqrt{8}} \begin{bmatrix} v_m \\ \varphi_n \varphi_{n'} \chi_m v_m \end{bmatrix}$$

wherein $\varphi_n = e^{j\pi n/2}$ $v_m = [\, 1 \quad e^{j2\pi m/A} \quad \ldots \quad e^{j2\pi m \times (N_t/2-1)/A} \,]^T$, $A = \dfrac{aN_t}{2}$, $\phi_{n'}$ represents a parameter for a co-phase with respect to a cross polarization antenna that is decided by $i_1''$, $N_t$ represents a number of transmission antenna ports, a represents an oversampling value, $i_1$ represents a first PMI, $i_2$ represents a second PMI, and L represents the size of $i_1$.

2. A user equipment feeding-back channel state information with respect to a downlink transmission in a wireless communication system supporting multiple antennae, the user equipment comprises:
a Radio Frequency Unit; and
a Processor,
wherein the Processor transmits a first precoding matrix index (PMI) and a second PMI for each sub-band, and
wherein a precoding matrix preferred by the UE is constructed by combining the first PMI and the second PMI, and
wherein a precoding codebook in which a portion of a plurality of bits forming the second PMI is additionally used to form the first PMI, wherein the precoding codebook with respect to Rank 1 is configured as follows:

| $i_1$ | $i_2$ | | | |
|---|---|---|---|---|
| | 0 | 1 | 2 | 3 |
| $0 \sim (2L-1)$ | $W_{2i_1',0,i_1''}^{(1)}$ | $W_{2i_1',1,i_1''}^{(1)}$ | $W_{2i_1'+1,0,i_1''}^{(1)}$ | $W_{2i_1'+1,1,i_1''}^{(1)}$ |

| | $i_2$ | | | |
|---|---|---|---|---|
| $i_1$ | 4 | 5 | 6 | 7 |
| 0~(2L−1) | $W^{(1)}_{2i_1'+2,0,i_1''}$ | $W^{(1)}_{2i_1'+2,1,i_1''}$ | $W^{(1)}_{2i_1'+3,0,i_1''}$ | $W^{(1)}_{2i_1'+3,1,i_1''}$ | where $i_1' = i_1 \mod L$ $i_1'' = 2 \times \lfloor i_1/L \rfloor$ $$W^{(1)}_{m,n,n'} = \frac{1}{\sqrt{8}} \begin{bmatrix} v_m \\ \varphi_n \varphi_{n'} v_m \end{bmatrix}$$

wherein, $\varphi_n = e^{j\pi n/2}$ $v_m = [\, 1 \quad e^{j2\pi m/A} \quad \ldots \quad e^{j2\pi m \times (N_t/2 - 1)/A} \,]^T$, $A = \dfrac{aN_t}{2}$, $\phi_{n'}$ represents a parameter for a co-phase with respect to a cross polarization antenna that is decided by $i_1''$, $N_t$ represents a number of transmission antenna ports, a represents an oversampling value, $i_1$ represents a first PMI, $i_2$ represents a second PMI, and L represents the size of $i_1$.

* * * * *